(12) United States Patent
Miura et al.

(10) Patent No.: US 9,025,174 B2
(45) Date of Patent: May 5, 2015

(54) PRINTING CONTROL DEVICE INCLUDING VIRTUAL DRIVE CONTROL UNIT, PRINTING DEVICE INCLUDING VIRTUAL DRIVE CONTROL UNIT, AND PRINTING CONTROL METHOD UTILIZING VIRTUAL DRIVE CONTROL UNIT

(71) Applicant: Seiko Epson Corporation, Tokyo (JP)

(72) Inventors: Hirotsuna Miura, Fujimi-machi (JP); Hayato Takahashi, Nagano (JP); Katsuhiko Otani, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/030,149

(22) Filed: Sep. 18, 2013

(65) Prior Publication Data

US 2014/0015875 A1   Jan. 16, 2014

Related U.S. Application Data

(63) Continuation of application No. 13/005,971, filed on Jan. 13, 2011, now Pat. No. 8,564,827.

(30) Foreign Application Priority Data

Jan. 20, 2010   (JP) .................................. 2010-010179

(51) Int. Cl.
*G06F 15/00* (2006.01)
*G06F 3/12* (2006.01)
*G06K 1/00* (2006.01)
*B41J 29/38* (2006.01)
*B41J 11/42* (2006.01)

(52) U.S. Cl.
CPC ............... *G06F 3/1201* (2013.01); *B41J 29/38* (2013.01); *B41J 11/42* (2013.01)

(58) Field of Classification Search
CPC .......... G06F 3/1201; B41J 29/38; B41J 11/42
USPC ....................................... 358/1.1–1.18, 474
See application file for complete search history.

(56) References Cited

U.S. PATENT DOCUMENTS

| 6,762,595 | B2 | 7/2004 | Tamai et al. |
| 7,311,379 | B2 | 12/2007 | Mitsuzawa |
| 7,886,170 | B2 | 2/2011 | Komatsu et al. |
| 2004/0190074 | A1* | 9/2004 | Kato ............................. 358/400 |
| 2007/0260753 | A1 | 11/2007 | Komatsu et al. |
| 2007/0285713 | A1 | 12/2007 | Yamamoto et al. |

FOREIGN PATENT DOCUMENTS

JP   2004-025551 A   1/2004

* cited by examiner

*Primary Examiner* — Douglas Tran
(74) *Attorney, Agent, or Firm* — Global IP Counselors, LLP

(57) ABSTRACT

A control device for a printer includes a master controller and a slave controller, and the constituent elements of the master controller and the slave controllers are configured symmetrically. The master controller includes a virtual mechanical controller.

5 Claims, 11 Drawing Sheets

PRINTING CONTROL DEVICE INCLUDING VIRTUAL DRIVE CONTROL UNIT, PRINTING DEVICE INCLUDING VIRTUAL DRIVE CONTROL UNIT, AND PRINTING CONTROL METHOD UTILIZING VIRTUAL DRIVE CONTROL UNIT

CROSS-REFERENCE TO RELATED APPLICATIONS

This is a continuation application of U.S. patent application Ser. No. 13/005,971 which claims priority to Japanese Patent Application No. 2010-010179 filed on Jan. 20, 2010. The entire disclosure of Japanese Patent Application No. 2010-010179 is hereby incorporated herein by reference.

BACKGROUND

1. Technical Field

The present invention relates to a printing control device for controlling a printing device, and to a printing device and a printing control method.

2. Related Art

Japanese Laid-Open Patent Application 2004-25551, for example, discloses a printing device comprising a plurality of recording heads (liquid spray means) for spraying ink. With this printing device, a plurality of print heads and a drive controller provided to each of a specific number of (one or more) print heads are installed on a carriage. A plurality of data processors that transfer data to each of the drive controllers are installed in the main body of the printing device. A specific number of print heads, one drive controller, and one data processor are connected to a main controller. This main controller also controls the reciprocal movement of the carriage. This printing device comprises a plurality of circuit sets that each comprises a specific number of print heads, one drive controller, and one data processor, so the processing load on each data processor is lower.

In this case, because a plurality of data processors are connected to a single main controller, the main controller should be synchronized with the processing of the various data processors. Furthermore, if there are many recording heads, the configuration may be such that the main controller itself is divided up into two or more printing control devices, and the numerous recording heads are allocated to and controlled by two or more main controllers. In this case, the timing at which carriage start-up commands are sent at the stage at which the recording heads have completed their recording commencement preparations for the recording medium, and the timing at which conveyance commands are sent for conveying the recording medium upon completion of recording, must be synchronized between the two or more printing control devices. Accordingly, one printing control device is used as the master (the master-side controller) and the other printing control device as the slave (slave-side controller). If the configuration is such that the master side sends a command to a drive control unit (mechanical controller, etc.) for the carriage system and the conveyance system at the stage when a command received from the slave side and a master-side command are both in order, then ink spray processing by the various recording heads controlled by the separate controllers, and conveyance processing of the print medium controlled by the drive control unit can be controlled at the proper timing.

Meanwhile, if an error occurs in the drive control unit, the two or more printing control devices must be synchronized and the command sent again, so the setup must be such that the two or more printing control devices are notified of this error, and the command resent to the drive control unit in synchronization between the two or more printing control devices.

SUMMARY

However, because a master-side printing control device and a slave-side printing control device must perform control while the master side synchronizes with the slave side, a problem has been that different programs and control circuits (integrated circuits, etc.) corresponding to the functions of each device have to be designed and produced. When printing control devices thus have to be separately developed for master and slave use, it leads to delays in the development of the printing device, and to higher development costs. Accordingly, it is preferable if programs, control circuits, and so forth can share their configuration as much as possible between the master-side printing control device and the slave-side printing control device.

The present invention was conceived in light of the above problem, and one object thereof is to provide a printing control device, a printing device, and a printing control method with which, in a configuration comprising a plurality of printing control devices, the printing control device (master) that exchanges controls with a drive control unit while synchronizing with the other printing control device (slave) shares a large portion of its configuration with the other printing control device.

To achieve the stated object, a printing control device according to a first aspect of the present invention includes an input unit, a processing unit, a control unit, a virtual drive control unit and a communication unit. The input unit is configured to input image data and commands. The processing unit is configured to process the image data and commands inputted by the input unit. The control unit is configured to send a command processed by the processing unit to a drive control unit that controls drive of a mechanical component. The virtual drive control unit is configured to allow input of the processed command along a different input path from an input path that goes through the input unit. The communication unit is interposed between the control unit and the drive control unit, and configured to inquire the virtual drive control unit whether the processed command has been inputted when the processed command is inputted from the control unit, and to output the processed command to the drive control unit if a reply from the virtual drive control unit indicates that the processed command has been inputted.

With this aspect, the communication unit asks the virtual drive control unit whether a processed command has been inputted when a processed command has been inputted from the control unit. The communication unit waits until there is a reply from the virtual drive control unit indicating that a processed command has been inputted, and when there is a reply to this effect, the processed command is outputted to the drive control unit. Therefore, a plurality of printing control devices are provided, and a command from the communication unit of a printing control device (master) can be outputted at a timing that is synchronized with the work period allocated to the various printing control devices by connecting the communication unit of the other printing control device (slave) to the virtual drive control unit of the printing control device (master) in which the communication unit is connected to what is to be controlled by the processed command. Furthermore, the printing control device (master) that exchanges controls with a drive control unit while synchronizing with the other printing control device (slave) can share a large portion of its configuration with the other printing control device (slave).

In the printing control device as described above, the communication unit is preferably further configured to send an error notification, which requests re-sending of the processed command, to both the communication unit and the virtual drive control unit when the error notification is inputted from the drive control unit.

With this aspect, when an error notification requesting the re-sending of a processed command from the drive control unit is inputted, the communication unit sends an error notification to both the control unit and the virtual drive control unit, after which the communication unit asks the virtual drive control unit whether the processed command has been inputted when the processed command for retransmission from the control unit is inputted. The communication unit waits until there is a reply from the virtual drive control unit indicating that a processed command has been inputted, and when there is a reply to this effect, the processed command is outputted to the drive control unit. Therefore, a plurality of printing control devices are provided, and an error notification from the drive control unit can be sent to each printing control device by connecting the communication unit of the other printing control device (slave) to the virtual drive control unit of the printing control device (master) in which the communication unit is connected to what is to be controlled by the processed command. Furthermore, a processed command for retransmission can be outputted to the drive control unit at a timing such that the processed commands for retransmission are the same for the various printing control devices. Thus, the printing control device (master) that exchanges controls with a drive control unit while synchronizing with the other printing control device (slave) can share a large portion of its configuration with the other printing control device (slave).

The printing control device as described above preferably further includes first and second printing control devices each equipped with the virtual drive control unit. The communication unit of the first printing control device is preferably connected to the drive control unit that controls the drive of the mechanical component, and the communication unit of the second printing control device is preferably connected to the virtual drive control unit of the first printing control device. With this aspect, a processed command can be outputted to the drive control unit by one of the printing control devices while the two printing control devices are synchronized.

The printing control device as described above preferably further includes master-side and slave-side printing control devices each equipped with an input unit configured to input commands, a control unit configured to control the output of commands, a communication unit configured to output commands, and a virtual drive control unit. The communication unit of the master-side printing control device is preferably connected to drive control unit configured to control the drive of the mechanical component, and the communication unit of the slave-side printing control device is preferably connected to the virtual drive control unit of the master-side printing control device. With the slave-side printing control device, when a command is inputted from the control unit, the communication unit inquires the virtual drive control unit for permission to output a command, the virtual drive control unit grants permission to send a command immediately in response to the inquiry from the communication unit, and the communication unit outputs a command if the reply from the virtual drive control unit is received. With the master-side printing control device, when a command is inputted from the control unit, the communication unit inquires the virtual drive control unit for permission to send a command, and the virtual drive control unit grants the communication unit permission to send a command when there are both the inquiry from the communication unit and a receipt of a command from the slave-side printing control device.

With this aspect, with the master-side printing control device, when a command is inputted from the control unit, the communication unit asks the virtual drive control unit. On the other hand, with the slave-side printing control device, when a command is inputted from the control unit, the communication unit asks the virtual drive control unit, but since a reply indicating that a command is permitted is received immediately from the virtual drive control unit, the command is outputted immediately. When a command from the slave side is received, the virtual drive control unit of the master-side printing control device replies indicating that command transmission is permitted to the communication unit of the master-side printing control device, and upon receiving this reply the communication unit sends the command to the drive control unit. Therefore, when work related to printing is divided up between the master-side printing control device and the slave-side printing control device, a command can be outputted to the drive control unit at a timing that is synchronized between the allocated work periods.

The printing control device as described above preferably further includes an identification unit configured to identify whether the printing control device is master or slave at start-up of the printing device. The virtual drive control unit preferably includes a master actualization component and a slave actualization component. The virtual drive control unit is preferably configured to start up either the master actualization component or the slave actualization component according to the identification result of the identification unit.

With this aspect, the identification unit identifies either master or slave at the start-up of the printing device, and starts up either the master actualization component or the slave actualization component that constitutes the virtual drive control unit, according to the identification result of the identification unit. Therefore, a plurality of printing control devices can be set to be the master-side printing control device that sends commands from the communication unit to the drive control unit, or can be set to be the slave-side printing control device that sends commands from the communication unit to the master-side printing control device.

In the printing control device as described above, the printing control device preferably includes a master-side printing control device configured such that the master actualization component is started up according to the identification result of the identification unit, and at least one slave-side printing control device configured such that the slave actualization component is started up according to the identification result of the identification unit. The virtual drive control unit of the slave-side printing control device preferably functions as a dummy virtual drive control unit that outputs an unconditional negative reply to a question from the communication unit when the slave actualization component is started up.

With this aspect, the virtual drive control unit of the slave-side printing control device functions as a dummy virtual drive control unit when the slave actualization component is started up, and returns an unconditional negative reply to a question from the communication unit. Therefore, the communication unit of the slave-side printing control device is able to output a command, and furthermore can output that command immediately, so the wait for input of the command to the virtual drive control unit on the master side is not that long.

With the printing control device as described above, the communication unit of the slave-side printing control device is preferably connected to the virtual drive control unit of the master-side printing control device.

With this aspect, a command outputted from the communication unit of the slave-side printing control device is inputted to the virtual drive control unit of the master-side printing control device. Accordingly, the virtual drive control unit on the master side can reply to the communication unit on the master side indicating that there is input of a command from the slave-side printing control device.

With the printing control device as described above, the identification unit preferably identifies either master or slave based on a signal level according to a connection state of a terminal of the printing control device. With this aspect, whether the device is master or slave can be identified with relative ease based on a signal level corresponding to the connection state of terminals on the printing control devices, which connect differently for master and slave.

With the printing control device as described above, the master-side printing control device and the slave-side printing control device each preferably includes a head control unit configured to control a liquid spray head based on the image data inputted by the input unit. The input unit of the master-side printing control device and the input unit of the slave-side printing control device each preferably inputs image data allocated according to the liquid spray head controlled by the head control unit.

With this aspect, the input unit of the master-side printing control device and the input unit of the slave-side printing control device each input image data for the liquid spray heads for which they are responsible, with a plurality of liquid spray heads being allocated among them, so unnecessary image processing can be avoided.

With the printing control device as described above, the master-side printing control device and the slave-side printing control device each preferably further includes a control management unit and a second communication unit. The control management unit is preferably configured to acquire data related to a liquid spray head allocated to a corresponding one of the master-side printing control device and the slave-side printing control device. The second communication unit is configured to send data managed by the control management unit of the other one of the master-side printing control device and the slave-side printing control device, among the data acquired by the control management unit of the corresponding one of the master-side printing control device and the slave-side printing control device, to the control management unit of the other one of the master-side printing control device and the slave-side printing control device. The control management unit is preferably configured to perform prescribed processing based on data not sent to the control management unit of the other one of the master-side printing control device and the slave-side printing control device among the data acquired by the control management unit of the corresponding one of the master-side printing control device and the slave-side printing control device, and data received by the second communication unit from the control management unit of the other one of the master-side printing control device and the slave-side printing control device.

With this aspect, the control management unit of the master-side printing control device and the slave-side printing control device can send to each other the data handled by the other control management unit, out of the data related to the liquid spray heads each is responsible for, through the second communication unit. Thus, even though the liquid spray heads are allocated between the master-side printing control device and the slave-side printing control device, all the data related to the liquid spray heads can be managed collectively.

With the printing control device as described above, each of the control management units is preferably configured to be allocated and manage a plurality of liquid holders for holding different types of liquid to be supplied to the liquid spray head, and to calculate as the data the amount of liquid consumed by the allocated liquid spray head. Each of the control management unit is preferably configured to calculate the liquid consumption or amount of remaining liquid in the allocated liquid holders based on the liquid consumption not sent to the control management unit of the other one of the master-side printing control device and the slave-side printing control device among the liquid consumption acquired by the control management unit of the corresponding one of the master-side printing control device and the slave-side printing control device, and the liquid consumption received by the second communication unit from the control management unit of the other one of the master-side printing control device and the slave-side printing control device.

With this aspect, the master side and the slave side send each other, with the second communication unit, the liquid consumption of the liquid holder to be managed on the other side, out of the liquid consumption by the plurality of liquid spray means allocated to the two sides, so the liquid consumption or the remaining amount of liquid can be computed for the liquid holders in question.

With the printing control device as described above, each of the control management units preferably includes an inspection control unit configured to inspect the nozzles of the allocated liquid spray head. The inspection control unit preferably determines whether or not to perform maintenance on the liquid spray heads based on a nozzle inspection result not sent to the inspection control unit of the other one of the master-side printing control device and the slave-side printing control device among the nozzle inspection result acquired by the inspection control unit of the corresponding one of the master-side printing control device and the slave-side printing control device, and a nozzle inspection result received by the second communication unit from the inspection control unit of the other one of the master-side printing control device and the slave-side printing control device, and if it is determined that maintenance should be performed, the control unit sends the communication unit a command to indicate maintenance.

With this aspect, since inspection is performed for a plurality of nozzles of the liquid spray means, it is easier to reduce clogging of the nozzles. Also, the same command can be sent between a plurality of printing control devices.

With the printing control device as described above, if there is no reply indicating that the command has been inputted after a set time has elapsed since an inquiry to the virtual drive control unit, an error notification requesting the retransmission of the command is preferably outputted via a second communication unit provided separately from the communication unit in order to perform communication between printing control devices.

With this aspect, if there is no reply indicating that the command has been inputted after a set time has elapsed since an inquiry to the virtual drive control unit, an error notification requesting the retransmission of the command is outputted to the other printing control device that is to output that command, via the second communication unit. Accordingly, the command can be retransmitted at both of the printing control devices even thought the communication unit has timed out because the set time has elapsed.

A printing device according to another aspect of the present invention includes the printing control device according to any one of the aspects described above, a conveyance unit configured to convey a printing medium, a conveyance drive control unit configured to control the drive of the conveyance unit based on a command from the printing control device, and a liquid spray head whose drive is controlled by the printing control device and that performs printing by spraying a liquid to the printing medium conveyed by the conveyance unit. With this aspect, the same effects can be obtained as with the above-mentioned inventions pertaining to a printing control device.

A printing control method according to another aspect of the present invention includes: inputting image data and a command; processing the image data and command inputted, and sending the processed command to a control unit; sending by the control unit, which has received the processed command, the processed command to a communication unit; and inquiring, by the communication unit, the virtual drive control unit whether the processed command has been inputted when the processed command is inputted from the control unit, and outputting the processed command to a drive control unit if there is a reply from the virtual drive control unit indicating that the processed command was inputted.

A printing control method according to another aspect of the present invention includes: sending an error notification to both a control unit and a virtual drive control unit when the error notification requesting retransmission of a processed command is inputted from a drive control unit; and inquiring the virtual drive control unit whether the processed command has been inputted when the processed command retransmitted from the control unit is inputted by a communication unit after transmission of the error notification, and outputting the processed command to the drive control unit if there is a reply from the virtual drive control unit indicating that the processed command has been inputted. With this aspect, the same effects can be obtained as with the above-mentioned inventions pertaining to a printing control device.

BRIEF DESCRIPTION OF THE DRAWINGS

Referring now to the attached drawings which form a part of this original disclosure.

DETAILED DESCRIPTION OF EXEMPLARY EMBODIMENTS

A specific embodiment of the printing control device of a lateral inkjet printer will now be described through reference to FIGS. 1 to 12.

Figure 1:
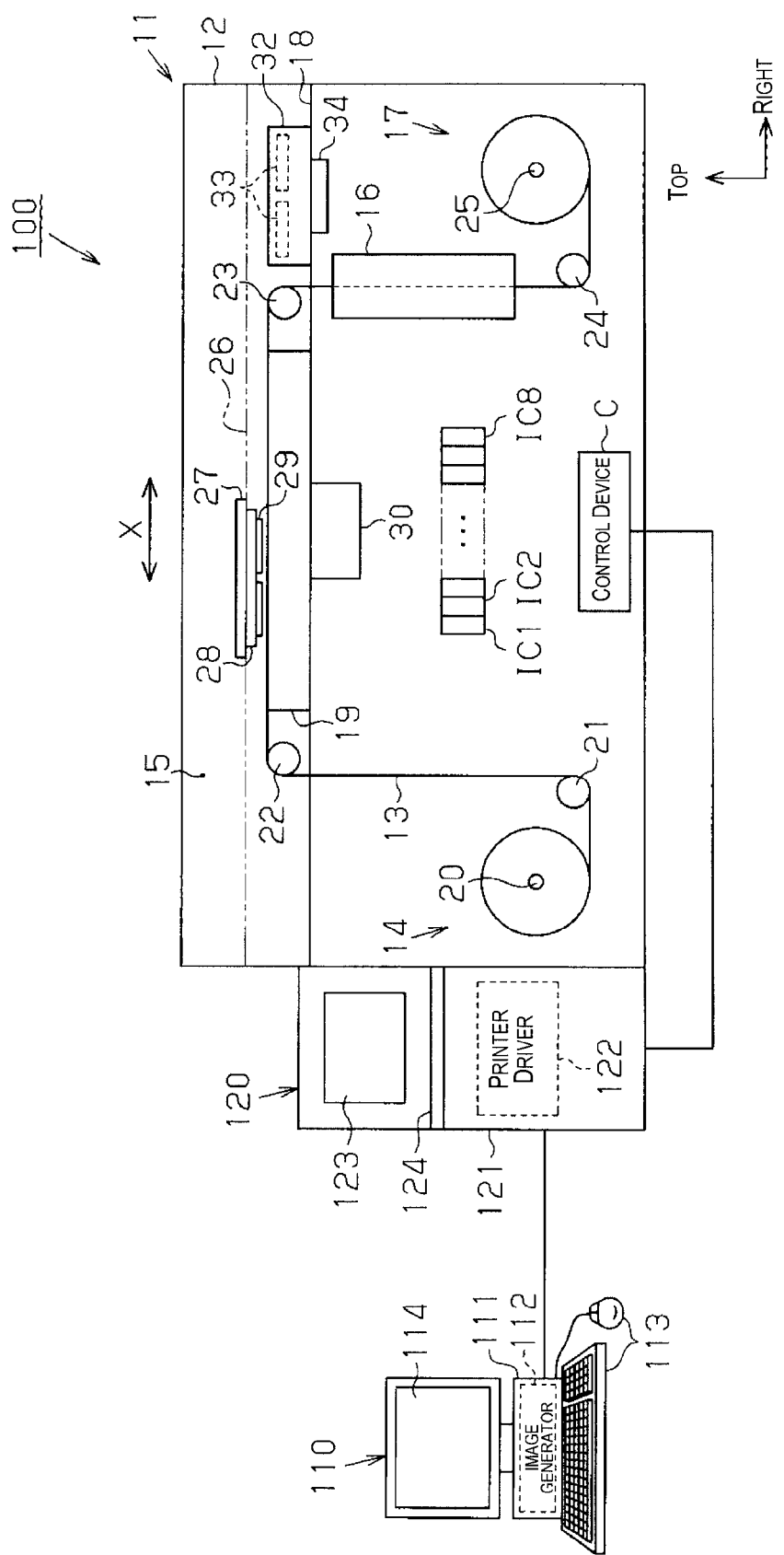
FIG. 1 is a schematic side view of a printing system in an embodiment.

FIG. 1 is a schematic diagram of a printing system comprising a lateral inkjet printer. As shown in FIG. 1, a printing system 100 comprises an image generation device 110 that generates image data, a host device 120 that generates print data based on the image data received from the image generation device 110, and a lateral inkjet printer 11 (hereinafter referred to simply as the "printer 11") serving as a printing device that prints images based on the image data received from the host device 120.

The image generation device 110 is constituted by a personal computer, for example, and comprises an image generator 112 constructed by the execution of image production software by a CPU in the main body 111 of the image generation device 110. The user starts up the image generator 112, produces an image on a monitor 114 by operating an input device 113, and directs the printing of the image by operating the input device 113. As a result, image data pertaining to that image is sent to the host device 120 via a specific communication interface.

The host device 120 is constituted by a personal computer, for example, and comprises a printer driver 122 constructed by the execution of printer driver software by a CPU in the main body 121 of the host device 120. The printer driver 122 generates print data based on the image data received from the image generation device 110, and sends it to a control device C provided to the printer 11. The control device C controls the printer 11 based on print data received from the printer driver 122, and causes the printer 11 to print an image based on the print data. A menu screen for inputting and setting control settings to the printer 11, an image of what is to be printed, or the like is displayed on a monitor 123.

Next, the configuration of the lateral inkjet printer in FIG. 1 will be described. In the descriptions in this Specification that follow, the terms "left and right direction" and "up and down direction" use as a reference the directions indicated by arrows in FIG. 1 and other drawings. In FIG. 1, the side closer to the viewer is called the front side, and the side farther away is called the rear side.

As shown in FIG. 1, the printer 11 comprises a cuboid main body case 12. Provided inside the main body case 12 are a play-out component 14 that plays out a long sheet 13, a printing chamber 15 that performs printing by spraying an ink, a drying apparatus 16 that dries the sheet 13 to which ink has adhered in this printing, and a winder 17 that winds up the sheet 13 that has undergone drying.

A flat base 18 that divides the inside of the main body case 12 into upper and lower segments is provided somewhat toward the top in the main body case 12, and the region above this base 18 serves as the printing chamber 15, in which a rectangular platen 19 is supported on the base 18. In the region that is below the base 18, the play-out component 14 is disposed at a position that is toward the left side and upstream in the conveyance direction of the sheet 13, and the drying apparatus 16 and the winder 17 are disposed at positions toward the right side and on the downstream side.

As shown in FIG. 1, a winding shaft 20 extending in the longitudinal direction is rotatably provided to the play-out component 14, and the sheet 13 is supported on this winding shaft 20 so as to be integrally rotatable in a state of being pre-wound into a roll. Specifically, the sheet 13 is played out from the play-out component 14 by the rotation of the winding shaft 20. The sheet 13 that has been played out from the play-out component 14 is wound onto a first roller 21 located to the right of the winding shaft 20, and is guided upward.

Meanwhile, a second roller 22 is provided in a state of being parallel to the first roller 21, at a position corresponding in the up and down direction to the lower first roller 21 that is to the left of the platen 19. After its conveyance direction has been changed to the vertical upward direction by the first roller 21, the sheet 13 is wound from below and on the left side of the second roller 22, which changes its conveyance direction to the horizontal direction (to the right) and causes it to slide over the upper face of the platen 19.

A third roller 23 that is opposite the second roller 22 with the platen 19 in between is provided in a state of being parallel to the second roller 22, on the right side of the platen 19. The positions of the second roller 22 and the third roller 23 are adjusted so that the tops of their peripheral faces are at the same height as the upper face of the platen 19.

After its conveyance direction has been changed to the horizontal direction (to the right) by the second roller 22 on the left side within the printing chamber 15, the sheet 13 is conveyed to the right (the downstream side) while sliding over the top of the platen 19, after which it is wound from above and on the right side of the third roller 23, which changes the conveyance direction to the vertical downward direction, so that the sheet 13 is conveyed toward the drying apparatus 16, which is lower than the base 18. After being dried by passing through the drying apparatus 16, the sheet 13 is conveyed farther in the vertical downward direction, after which it is wound onto a fourth roller 24, which changes the conveyance direction to the horizontal direction (to the right), and the sheet 13 is wound into a roll shape by the rotation of a winding shaft 25 disposed to the right of the fourth roller 24, under the drive force of a conveyance motor 61 (see FIG. 4).

As shown in FIG. 1, a pair of guide rails 26 (indicated by a two-dot chain line in FIG. 1) extending to the left and right are provided on both sides in front and back of the platen 19 in the printing chamber 15. The upper faces of the guide rails 26 support a rectangular carriage 27 in a state in which reciprocal motion is possible in a main scanning direction X (the left and right direction in FIG. 1) along the guide rails 26 under the drive of CR motors 62 and 63 (see FIG. 4). A plurality of recording heads 29 are supported via a support plate 28 on the lower face side of this carriage 27.

A specific range from the left end to the right end of the platen 19 serves as the printing region, and the sheet 13 is conveyed intermittently in units of this printing region. The sheet 13 is printed by spraying ink from the recording heads 29 as the carriage 27 moves back and forth with respect to the sheet 13 that is stopped on the platen 19.

During printing, a suction apparatus 30 provided on the lower side of the platen 19 is driven, and the sheet 13 is held against the upper face of the platen 19 by the attractive force produced by negative pressure at numerous suction holes formed in the upper face of the platen 19. Once a single print job has been completed on the sheet 13, the negative pressure of the suction apparatus 30 is released, and the sheet 13 is conveyed away.

Inside the printing chamber 15, a maintenance apparatus 32 for servicing the recording heads 29 when printing is not in progress is provided in the non-printing region to the right of the third roller 23. The maintenance apparatus 32 is equipped with a cap 33 for each recording head 29 and an elevator 34. The caps 33 are driven by the elevator 34 and move between a capping position, at which they come into contact with nozzle formation faces 35 (see FIG. 2) of the recording heads 29, and a retracted position, at which they are separated from the nozzle formation faces 35. In this embodiment, the caps 33 are also used as part of nozzle inspection components 48 (see FIG. 4) that checks for clogging of the recording heads 29.

As shown in FIG. 1, a plurality of (such as eight) ink cartridges IC1 to IC8, which hold different colors of ink, are removably mounted inside the main body case 12. The ink cartridges IC1 to IC8 are connected to the recording heads 29 through ink supply tubes (not shown), and the recording heads 29 spray ink supplied from the ink cartridges IC1 to IC8. Accordingly, with the printer 11 in this example, color printing is possible by using eight colors of ink.

The eight ink cartridges IC1 to IC8 hold ink that is black (K), cyan (C), magenta (M), yellow (Y), etc. A moisturizing liquid cartridge that holds a moisturizing liquid may also be installed. Naturally, the types of ink (how many colors) can be set as needed, and a configuration may be employed in which monochrome printing is performed with black ink alone, or a configuration in which there are two colors of ink, or there are three or more (a number other than eight) colors, and any number of colors may be used.

The ink cartridges IC1 to IC8 are electrically connected to the control device C via a cartridge holder (not shown) in which these ink cartridges are mounted, and information about the remaining amounts of ink of corresponding colors is written to the memory of IC elements 47 (integrated circuit elements; see FIG. 4) mounted on the ink cartridges IC1 to IC8.

Figure 2:
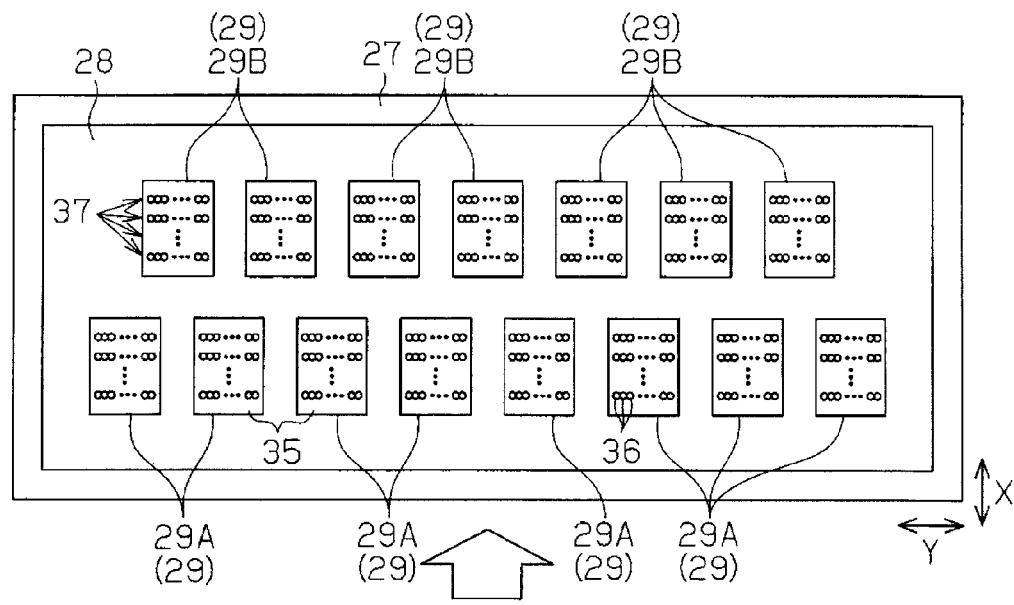
FIG. 2 is a schematic bottom view of a recording head.

FIG. 2 is a schematic view of the bottom face of a cartridge. As shown in FIG. 2, a plurality of (15 in this embodiment) the recording heads 29 are supported on the support plate 28, which is supported on the lower face side of the carriage 27, in a zigzag layout pattern along the width direction (longitudinal direction) perpendicular to the conveyance direction of the sheet 13 (the direction indicated by the outlined white arrow in FIG. 2). A plurality of (eight in this embodiment) nozzle rows 37, in which a plurality of nozzles 36 are disposed in a single row in the longitudinal direction, are formed in the nozzle formation faces 35, which are the lower faces of the recording heads 29, in a specific spacing in the main scanning direction X.

Figure 4:
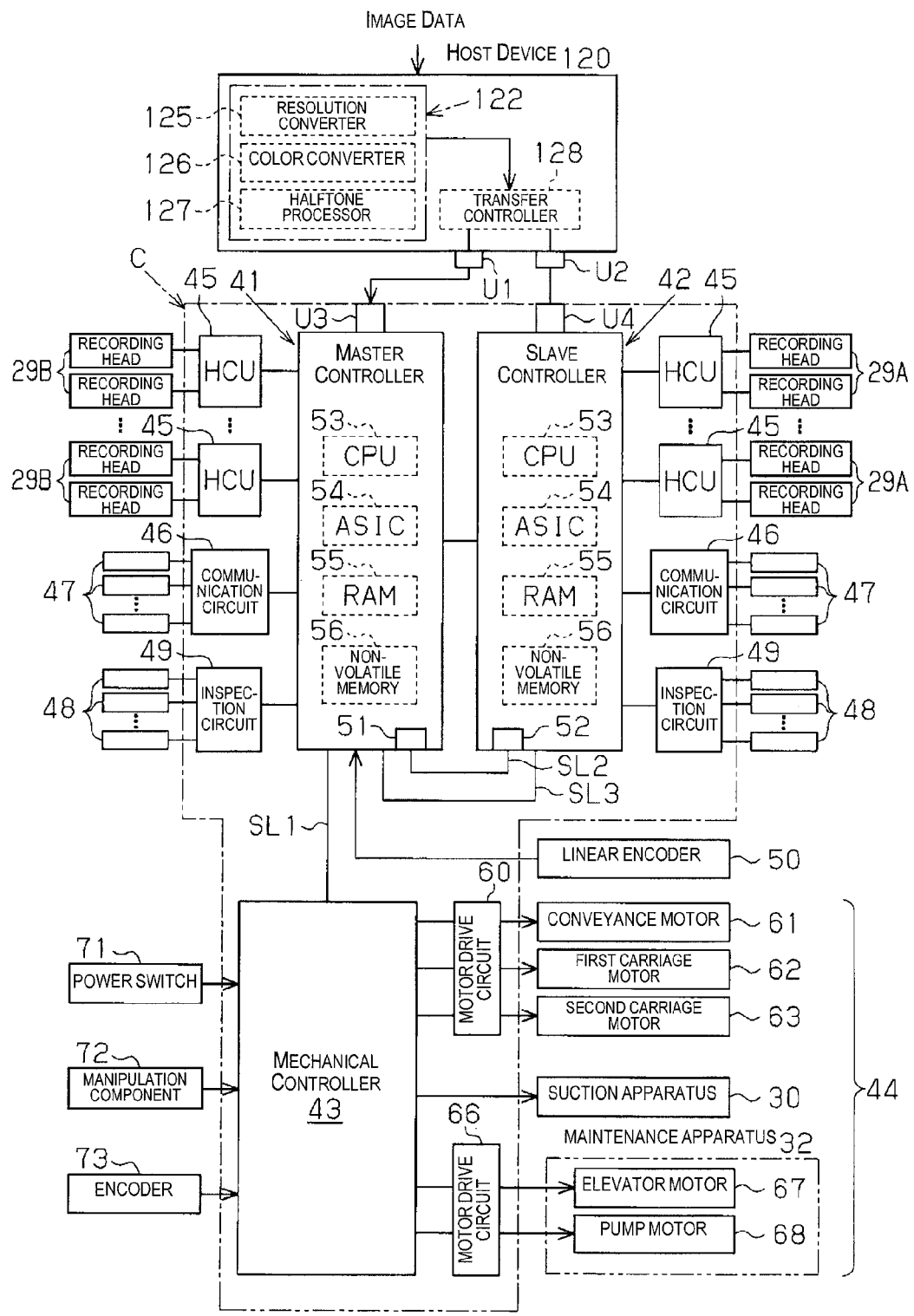
FIG. 4 is a block diagram of the electrical configuration of a printing system.

FIG. 4 is a block diagram of the electrical configuration of the printing system 100. The printer driver 122 in the host device 120 shown in FIG. 4 comprises a resolution converter 125, a color converter 126, and a halftone processor 127, which subject image data ID received from the image generation device 110 to the image processing that is necessary for the production of print data. The resolution converter 125 performs resolution conversion processing to convert the image data ID from display resolution to print resolution. The color converter 126 performs color conversion processing to convert from a display-use color specification system (such as an RGB color specification system) to a printing-use color specification system (such as a CMYK color specification system). The halftone processor 127 performs halftone processing, etc., to convert display-use image data with high tone (such as 256-tone) into printing-use image data with low tone (such as two-tone or four-tone). The printer driver 122 then produces print job data (hereinafter referred to simply as "print data PD") by assigning a command described by a print control code (such as EPC/P) to print image data PI produced as a result of performing the above image processing.

The host device 120 comprises a transfer controller 128 that controls the transfer of data. The transfer controller 128 sequentially and serially transfers the print data PD produced by the printer driver 122 to the printer 11 in data packets of a specific volume.

Meanwhile, the control device C on the printer 11 side comprises a pair of controllers 41 and 42 for performing various kinds of control, including control over the recording system by receiving the print data PD from the host device 120. These controllers 41 and 42 are provided as a pair in order to divide up the plurality of recording heads 29 (15 in this example) into two specific group sizes (seven and eight recording heads in this example) so that their control is allocated. Specifically, there are provided a master controller 41 that handles the control of the seven recording heads 29B, and a slave controller 42 that handles the control of the eight recording heads 29A.

The control device C further comprises a mechanical controller 43 that is connected through a communication line SL1 to the output side (the control downstream side) of the master controller 41. The mechanical controller 43 is mainly in charge of the control of a mechanical component 44 that includes the conveyance system and the carriage drive system. The master controller 41 sends the mechanical controller 43 a carriage start-up command at the stage when print preparations are ready for the seven recording heads 29B it handles itself (that is, when print image data is ready for use in ink droplet spray control), and print preparations are ready for the eight recording heads 29A handled by the slave controller 42. This prevents spray malfunctioning, in which the ink droplets are not sprayed even though the recording heads 29 have reached their spray position, which is attributable to start-up of the carriage 27 before print preparation are complete for either of the controllers 41 and 42.

Also, the master controller 41 sends the mechanical controller 43 a conveyance command, directing the conveyance of the sheet 13, at the stage when printing is complete with the seven recording heads 29B it handles itself, and printing is also complete with the eight recording heads 29A handled by the slave controller 42. This prevents offset in the droplet landing position (printing position offset) with respect to the sheet 13 of the ink droplets sprayed from the recording heads 29, which is attributable to the conveyance of the sheet 13 being started (or the release of sheet suction on the platen 19) prior to the completion of printing by one of the controllers 41 and 42. Thus, the master controller 41 needs to have the function of sending commands in synchronization with the advance of the slave controller 42. Accordingly, the controllers 41 and 42 each function differently in that one has the master function and one the slave function, even though the head control functions with respect to the corresponding recording heads 29 are the same. This embodiment is characterized in that the master controller 41 and the slave controller 42 can be realized with the same program configuration even though their functions are partially different as discussed above.

The printer driver 122 in the host device 120 shown in FIG. 4 produces two sets of print data PD1 and PD2 (see FIG. 5) by dividing in two the print image data PI according to the positions of the recording heads 29 handled by the two controllers 41 and 42, and assigning the same commands to each set of divided print image data.

As shown in FIG. 4, the host device 120 comprises two serial communication ports U1 and U2. The two controllers 41 and 42 also comprise serial communication ports U3 and U4. The transfer controller 128 serially transfers the print data PD1 corresponding to the master controller 41 via communication between the serial communication ports U1 and U3, and serially transfers the print data PD2 corresponding to the slave controller 42 via communication between the serial communication ports U2 and U3. In this embodiment, USB (universal serial bus) ports are used, for example, as the serial communication ports U1 to U4. The host device 120 performs serial transfer with two systems by means of two USB hosts constituting the two serial communication ports U1 and U2, and transfers the print data PD1 and PD2 at a relatively high speed to the controllers 41 and 42.

However, since serial transfer is relatively slow despite the use of two systems, with the lateral printer 11 of this embodiment, printing is to be started after the print data for a single job (one page) has been completely received. This is because if the printing is started at the stage when the receipt of one pass of print data is complete, for example, there will be a standby time of waiting for the completion of receipt of the next pass of print data in the middle of the procedure, so the carriage 27 must be temporarily retracted to its home position (standby position) within the non-printing region, and the recording heads 29 capped with the caps 33, in order to avoid clogging due to thickening of the ink in the nozzles during this time. If the carriage 27 is thus retracted to its home position in the middle of one printing job, the time the printing takes actually ends up being longer, so printing is to be started after the receipt of all of the print data for a single job (one page).

As shown in FIG. 4, the two controllers 41 and 42 are each connected to a plurality of (N number (four in this example)) head control units 45 (hereinafter referred to simply as HCUs 45), and each of the HCUs 45 is connected to a plurality of (M number (two in this example)) recording heads 29.

Four (one half) of the eight IC elements 47 mounted to the eight ink cartridges IC1 to IC8 are connected to each communication circuit 46 connected to the two controllers 41 and 42. The master controller 41 is able to communicate with the IC elements 47 mounted to the four ink cartridges IC1 to IC4, and the slave controller 42 is able to communicate with the IC elements 47 mounted to the four ink cartridges IC5 to IC8. The memory of the IC elements 47 stores information about the remaining amount of ink in the corresponding cartridges.

The master controller 41 manages the amount of remaining ink in the four ink cartridges IC1 to IC4, while the slave controller 42 manages the amount of remaining ink in the four ink cartridges IC5 to IC8. The master controller 41 communicates with the IC elements 47 of the ink cartridges IC1 to IC4 via the communication circuit 46, allowing the reading of ink information and remaining ink amount information stored in the memory thereof, and the writing of remaining ink amount information. Similarly, the slave controller 42 communicates with the IC elements 47 of the ink cartridges IC5 to IC8 via the communication circuit 46, allowing the reading of ink information and remaining ink amount information stored in the memory thereof, and the writing of remaining ink amount information.

The controllers 41 and 42 read the remaining ink amount from the memory of the IC elements 47 at the start-up of the printer 11, compute at specific intervals the amount of ink consumed by the ink cartridges being managed, and successively compute the current remaining ink amount for each ink cartridge. The controllers 41 and 42 then write to the memory of the IC elements 47 the current remaining ink amount information being managed at the point of power shut-off of the printer 11, for example. The host device 120, for instance, acquires remaining ink amount information by communicating with the controllers 41 and 42 of the printer 11, and displays the remaining ink amount for the ink cartridges IC1 to IC8 on the monitor 123 (see FIG. 1).

Furthermore, the printer 11 is provided with a nozzle inspection device having a plurality of (15 in this example)

nozzle inspection components 48 that check for nozzle clogging for every recording head 29. Seven and eight of the nozzle inspection components 48 are respectively connected via an inspection circuit 49 to the two controllers 41 and 42 shown in FIG. 4. The nozzle inspection components 48 in this embodiment are provided to each of the caps 33, which are provided in the same number as the recording heads 29 to the maintenance apparatus 32. The nozzle inspection components 48 check for a change in potential on the cap 33 side during the time up until the sprayed ink droplets land on the caps 33 in the spraying of charged ink droplets from the nozzles toward the caps 33, and thereby detect any defective nozzles that cannot spray the proper amount of ink droplets due to nozzle clogging, bubbles, or the like, based on the waveform of a detection signal corresponding to this change in potential. The control or management of the recording heads 29, the IC elements 47, and the nozzle inspection components 48 thus provided in plural number to the printer 11 is shared by the two controllers 41 and 42, which is more efficient because the load borne by each is lessened, so the two controllers 41 and 42 share control and management.

As shown in FIG. 4, a linear encoder 50 is connected to the master controller 41. This linear encoder 50 is provided along the movement path of the carriage 27, and a detection signal (encoder pulse signal) having a number of pulses proportional to the movement distance of the carriage 27 is inputted from this linear encoder 50. The controllers 41 and 42 comprise terminals 51 and 52, respectively, and the encoder pulse signal inputted to the master controller 41 is transmitted to the slave controller 42 through a signal line SL2 connected between the terminals 51 and 52. Furthermore, the master controller 41 and the slave controller 42 are connected to each other through a communication line SL3.

As shown in FIG. 4, the controllers 41 and 42 each comprise a CPU 53 (central processing unit), an ASIC 54 (application specific integrated circuit), a RAM 55, and a nonvolatile memory 56. The CPU 53 executes programs stored in the nonvolatile memory 56, and thereby executes various tasks necessary for printing control. The ASIC 54 performs data processing of the recording system and other such print data processing, for example. The ASIC 54 counts by color the dots corresponding to the number of times ink is sprayed from the recording heads 29 based on print image data, adds up the number of dots of each color for every recording head, and also computes the ink consumption by color. Here, the ASIC 54 on the master side calculates by color the ink consumption of the seven recording heads 29B, and the ASIC 54 on the slave side calculates by color the ink consumption of the eight recording heads 29A.

The master controller 41 sends the slave controller 42 the ink consumption for four colors supposed to be stored in the in the IC elements 47 connected to the slave side, out of the ink consumption for all eight colors consumed by the seven recording heads 29B. Meanwhile, the slave controller 42 sends the master controller 41 the ink consumption for four colors supposed to be stored in the in the IC elements 47 connected to the master side, out of the ink consumption for all eight colors consumed by the eight recording heads 29A. The controllers 41 and 42 add by color the ink consumption for the four unsent colors calculated by their own ASIC 54 and the ink consumption for the same four colors received from the other controller, and find the ink consumption of the four ink cartridges IC that they handle themselves. The ink consumption computed this time is subtracted from the ink consumption up to that point stored in the memory of the IC elements 47, to acquire the remaining ink amount by color at each time.

For example, when there is a request for remaining ink amount information from the printer driver 122 of the host device 120, the controllers 41 and 42 send each other the remaining ink amounts for the four colors managed by the other side, and send the printer driver 122 of the host device 120 the remaining ink amount information for all eight colors, which is the total of the remaining ink amount for the four colors received from the other side and the remaining ink amount for the four colors managed by the controller itself. The printer driver 122 receives remaining ink amount information for eight colors from each of the controllers 41 and 42, and displays an indicator that shows the remaining ink amount for all eight colors on the monitor 123 based on the remaining ink amount information for eight colors received from one of the controllers (such as the master side).

Meanwhile, the conveyance motor 61, a first carriage motor 62, and a second carriage motor 63 constituting the mechanical component 44 are each connected via the motor drive circuit 60 to the mechanical controller 43. The suction apparatus 30 is connected to the mechanical controller 43. Further, an elevator motor 67 and a pump motor 68 constituting the maintenance apparatus 32 are each connected via a motor drive circuit 66 to the mechanical controller 43.

Also, a power switch 71, a manipulation component 72, and an encoder 73 are each connected as an input system to the mechanical controller 43. A power supply on/off signal based on the operation of the power switch 71 is outputted from the mechanical controller 43 and inputted to the controllers 41 and 42. The controllers 41 and 42 start up when an on signal from the power switch 71 is inputted. The mechanical controller 43 controls the drive of the motors 61 to 63, 67, and 68 and the suction apparatus 30 according to various commands received from the master controller 41 through the communication line SL1.

During printing, the control device C performs a conveyance operation in which the conveyance motor 61 is driven and the sheet 13 to be disposed on the platen 19 is conveyed through the next printing region, a suction operation in which the next printing region after sheet conveyance is held against the platen 19 by suction, a printing operation in which the sheet 13 is printed with the recording heads 29, and a suction release operation in which the suction on the sheet 13 is released after completion of the printing of one job (one page). Here, the printing operation is carried out by spraying droplets of ink from the recording heads 29 during movement of the carriage 27 in the main scanning direction X. This printing operation is carried out by repeating a specific number of times the movement of the carriage 27 in the main scanning direction (one pass operation) by drive of the first carriage motor 62, and movement of the carriage 27 in a sub scanning direction Y that is performed at the end of every pass.

Figure 5:
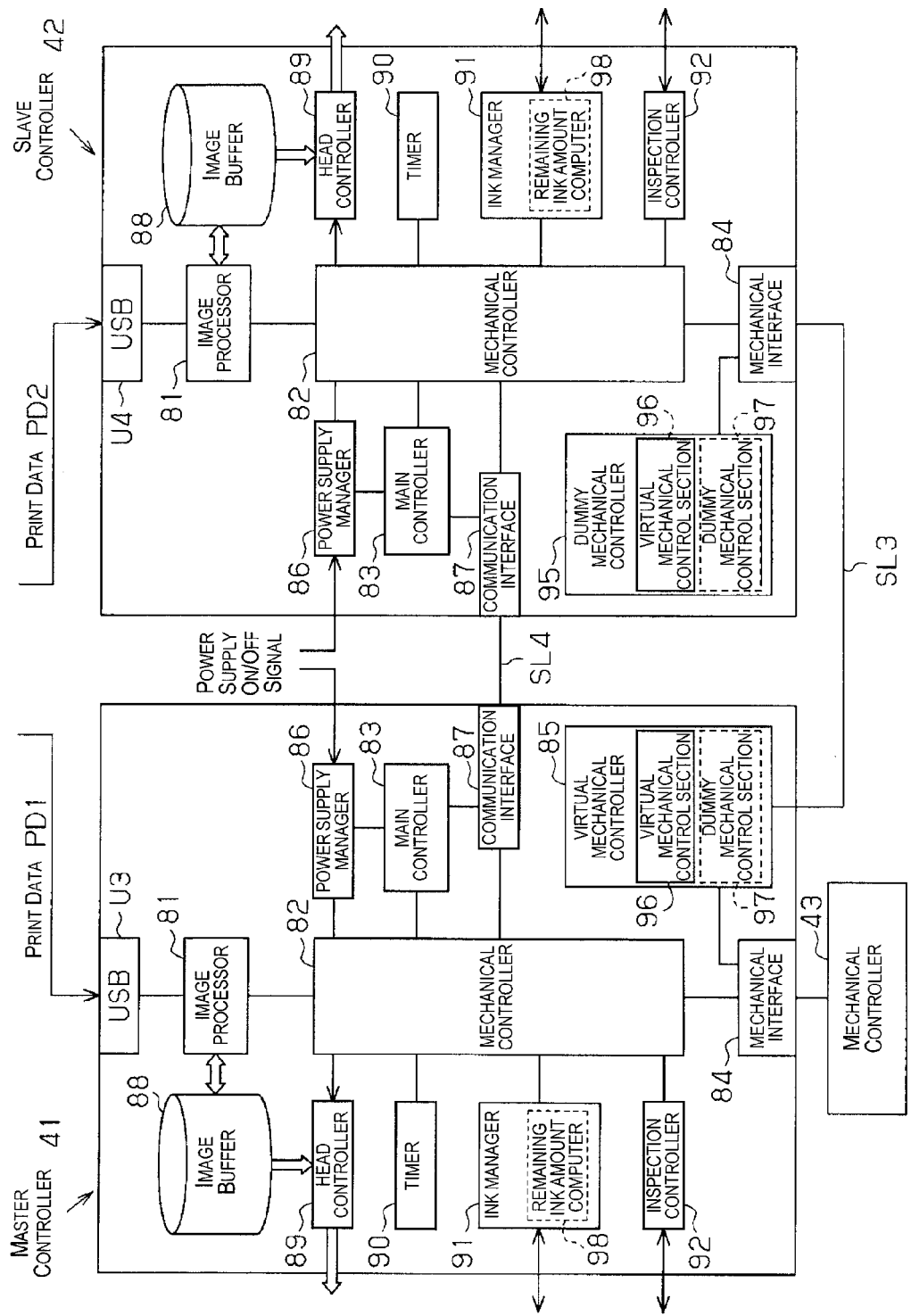
FIG. 5 is a block diagram of the master and slave controller configuration.

FIG. 5 is a block diagram illustrating the function configurations of the master controller 41 and the slave controller 42. As shown in FIG. 5, the controllers 41 and 42 have mutually symmetrical configurations. Since the configurations are symmetrical (the function configurations are substantially the same), the configuration of the master controller 41 will be described below, and the configuration of the slave controller 42 that is partially different will be described by contrast.

As shown in FIG. 5, the master controller 41 comprises the USB port U3 as an example of an input unit, an image processor 81 as an example of a processing unit, a mechanical controller 82 as an example of a control unit, a main controller 83, a mechanical interface 84 as an example of a communication unit, and a virtual mechanical controller 85 as an example of a virtual drive control unit. Furthermore, the master controller 41 comprises a power supply manager 86, a communication interface 87, an image buffer 88, a head controller 89, a timer 90, an ink manager 91, and an inspection controller 92. Meanwhile, the slave controller 42 only differs in that a dummy mechanical controller 95 is provided as an example of a virtual drive control unit instead of the virtual mechanical controller 85, and the rest of the configuration is the same as that of the master controller 41. The main controller 83 has the function of comprehensively controlling the components 82 and 84 to 92.

Also, the mechanical interface 84 of the slave controller 42 is connected through the communication line SL3 to the virtual mechanical controller 85 of the master controller 41. Specifically, the mechanical interface 84 of the master controller 41 is connected to the actual mechanical controller 43, whereas the mechanical interface 84 of the slave controller 42 is connected to the virtual mechanical controller 85 provided inside the master controller 41. The mechanical interface 84 on the slave side intends to output a command to the mechanical controller 43, but actually sends a command to the virtual mechanical controller 85.

The USB port U3 in the master controller 41 shown in FIG. 5 inputs the print data PD1 from the printer driver 122 of the host device 120 (see FIGS. 1 and 4). The image processor 81 on the master side performs image processing such as extraction of the print data PD1, command analysis, microweaving, and vertical-horizontal conversion. Meanwhile, the USB port U4 in the slave controller 42 shown in FIG. 5 inputs the print data PD2 from the printer driver 122 of the host device 120 (see FIGS. 1 and 4). The image processor 81 on the slave side performs image processing such as extraction of the print data PD2, command analysis, microweaving, and vertical-horizontal conversion.

The image processor 81 temporarily stores the extracted image data in the image buffer 88, and performs command analysis on the print data read from the image buffer 88. The print data PD here includes print image data and a command. Command analysis is performed on the extracted print data to acquire a command, and the acquired command is sent to the mechanical controller 82. The image processor 81 subjects the print image data from which the command has been separated to microweaving and then to vertical-horizontal conversion processing, and the print image data thus obtained is stored in the image buffer 88.

The microweaving referred to here is processing in which pixel data is rearranged so as to weaken the effect of variance in nozzle position, by changing the nozzles used so that the nozzles forming printing heads that are adjacent in the sub scanning direction Y will not be adjacent nozzles, in order to prevent the occurrence of variance in the print dot positions, which is caused by variance in the nozzle positions of the recording heads 29. Also, vertical-horizontal conversion is processing in which the sequence of pixels in the lateral direction for display use (the direction in which the nozzle rows are arranged) is changed to a sequence in the longitudinal direction (nozzle row direction), in accordance with the spray order in which ink droplets are sprayed from the nozzles 36 of the recording heads 29, since the print image data (plain data) obtained by extracting the print data PD with the image processor 81 is data about the sequence of the display-use pixels.

The head controller 89 reads from the image buffer 88 the head control data produced by subjecting the print image data to image processing, while dividing up this data for each of the recording heads 29, and successively sends the head control data to from the head control units 45 to the recording heads 29. Head drive circuits (not shown) in the recording heads 29 control the drive of spray drive elements for each of the nozzles 36 based on the head control data, and sprays ink droplets from the nozzles 36. At this point the head controller 89 produces a spray timing signal based on an encoder pulse signal inputted from the linear encoder 50, and the head drive circuits drive the spray drive elements based on this spray timing signal.

The mechanical controller 82 shown in FIG. 5 sends the command received from the image processor 81 to the mechanical interface 84. The mechanical controller 82 at this point is monitoring the progress of the processing done by the head controller 89, for example, and sends the command to the mechanical interface 84 at the stage when the head control data used in the next pass of printing is ready and printing preparations are complete.

Upon receiving a command from the mechanical controller 82, the mechanical interface 84 sends an inquiry to the virtual mechanical controller 85. When the mechanical interface 84 receives an Ack signal (acknowledgement signal) as the reply to its inquiry from the virtual mechanical controller 85, it sends a command to the mechanical controller 43. That is, if the mechanical interface 84 has not received an Ack signal as the reply to its inquiry to the virtual mechanical controller 85, it goes into standby until it does receive an Ack signal, and once it receives an Ack signal, it sends a command to the mechanical controller 43. However, if the standby period times out (reaches a preset length of time), a message to that effect is sent through the mechanical controller 82 to the main controller 83.

The image processor 81, the mechanical controller 82, and the mechanical interface 84 perform the same processing at the slave controller 42. However, the dummy mechanical controller 95 has a different function from that of the virtual mechanical controller 85. The dummy mechanical controller 95 immediately and unconditionally returns an Ack signal when an inquiry is received from the mechanical interface 84. Accordingly, when the mechanical interface 84 in the slave controller 42 receives a command from the mechanical controller 82 and makes an inquiry, an Ack signal is received immediately from the dummy mechanical controller 95, so there is almost no waiting time from the receipt of the command until that command can be outputted.

In contrast, when the virtual mechanical controller 85 in the master controller 41 receives an inquiry from the mechanical interface 84, it returns an Ack signal to the mechanical interface 84 on the condition of receipt of the command sent through the communication line SL3 at the input port (input terminal; a different input port from the USB port U3) connected to the communication line SL3. Accordingly, the command can be sent to the mechanical controller 43 in synchronization between the master and slave controllers 41 and 42.

As shown in FIG. 5, the virtual mechanical controller 85 and the dummy mechanical controller 95 have the same configuration, and both comprise a virtual mechanical control section 96 and a dummy mechanical control section 97. When the virtual mechanical control section 96 is actuated, it functions as the virtual mechanical controller 85, and when the dummy mechanical control section 97 is actuated, it functions as the dummy mechanical controller 95. The main controller 83 decides whether to actuate the virtual mechanical control section 96 or the dummy mechanical control section 97 by identifying whether the controller itself is a master or a slave. If the main controller 83 identifies itself as a master, the virtual mechanical control section 96 is activated and actuated, and the dummy mechanical control section 97 is deactivated and not actuated. On the other hand, if the main controller 83 identifies itself as a slave, the dummy mechanical control section 97 is activated and actuated, and the virtual mechanical control section 96 is deactivated and not actuated.

A power supply on/off signal is inputted from the power switch 71 to the power supply manager 86. When a power on signal is inputted, the power supply manager 86 actuates the master controller 41 by starting a supply of power supply voltage to it, but when a power off signal is inputted, the supply of voltage to the master controller 41 is halted.

Figure 3:
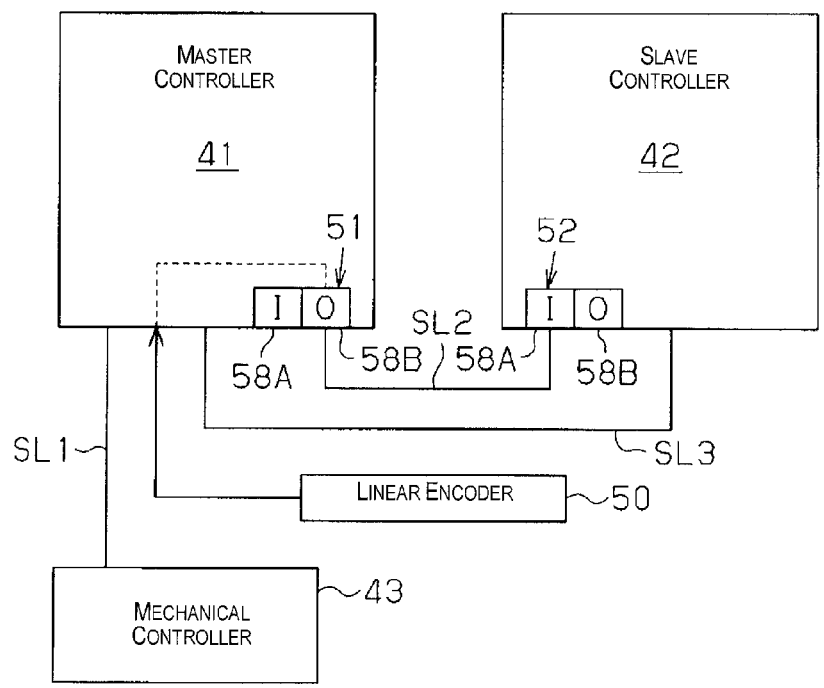
FIG. 3 is a schematic diagram of the connection state of the master and slave controllers.

In this embodiment, the main controller 83 identifies either master or slave based on the state of the signal level of the terminals 51 and 52 (see FIG. 4). FIG. 3 illustrates this identification method, and is a schematic of the connection state of the master and slave controllers 41 and 42. As shown in FIG. 3, the terminals 51 and 52 connect wiring for transmitting detection signals (encoder pulse signals) of the linear encoder 50 between the controllers 41 and 42, or between the controllers 41 and 42 and another relay circuit, and comprise an input terminal 58A and an output terminal 58B. In the example of this embodiment shown in FIG. 3, no relay circuit is interposed, and the controllers 41 and 42 are directly connected through the signal line SL2. In this case, since the master side is the signal output source and the slave side is the signal output destination, as shown in FIG. 3 the output terminal 58B of the terminal 51 of the slave controller 42 and the input terminal 58A of the terminal 52 of the slave controller 42 are connected by the signal line SL2. Since the combination of voltage levels of the input terminal 58A and the output terminal 58B at the terminals 51 and 52 varies depending on master, slave, or relay circuit, the main controller 83 identifies whether the controller assigned to itself is the master or the slave from this combination of voltage levels. In this example, the voltage level of the input terminal 58A and the output terminal 58B is the low level when the signal line SL2 is connected, and is the high level when the signal line SL2 is not connected. Thus, the main controller 83 identifies as "master" if the combination (Vin, Vout) of voltage levels of the input terminal 58A and the output terminal 58B is (Vin, Vout)=(high, low), and as "slave" if the combination is (Vin, Vout)=(low, high). The main controller 83 activates and actuates the virtual mechanical control section 96 if it is the master, and activates and actuates the dummy mechanical control section 97 if it is the slave.

The mechanical interface 84 in the master controller 41 shown in FIG. 5 receives an error notification (error message) indicating that retransmission of the command from the mechanical controller 43 is requested, when an error occurs at the mechanical controller 43. Upon receipt of an error notification, the mechanical interface 84 sends the error notification to the virtual mechanical controller 85, and if an Ack signal (acknowledgement signal) is received as the reply from the virtual mechanical controller 85, that error notification is also sent to the higher mechanical controller 82.

When an error notification is received from the mechanical interface 84, the virtual mechanical controller 85 sends the error notification through the communication line SL3 to the mechanical interface 84 on the slave side. When the error notification is sent to the mechanical interface 84 on the slave side, the virtual mechanical controller 85 replies with an Ack signal to the mechanical interface 84. When the received error notification is sent to the dummy mechanical controller 95 and the reply from the dummy mechanical controller 95 is an Ack signal, the mechanical interface 84 sends the error notification to the higher mechanical controller 82. When an error notification is received, the dummy mechanical controller 95 cancels this and replies unconditionally with an Ack signal. Accordingly, the error notification from the mechanical controller 43 is sent from the mechanical interface 84 to the mechanical controller 82 in the case of both master and slave, and is further sent from the mechanical controller 82 to the main controller 83. When an error notification is received, the main controller 83 directs the mechanical controller 82 to resend the command, and upon receiving this directive, the mechanical controller 82 resends the command. In this case, the mechanical interface 84 that has received the command from the mechanical controller 82 sends a command inquiry to the virtual mechanical controller 85, and if an Ack signal is received as the reply, a command is sent to the mechanical controller 43.

If a communication error should occur in the communication line SL3, the slave controller 42 cannot send a command to the virtual mechanical controller 85. That is, if a communication error should occur in the communication line SL3, the master controller 41 cannot receive a command from the slave controller 42. If this happens, the mechanical interface 84 on the master side cannot receive an Ack signal from the virtual mechanical controller 85, so the standby time reaches the set time, and times out. Meanwhile, the mechanical interface 84 of the slave controller 42 cannot receive an Ack signal from the virtual mechanical controller 85, either, so the standby time reaches the set time, and once again times out.

If the mechanical interface 84 times out, a message to that effect is sent through the mechanical controller 82 to the main controller 83. Upon receiving a time-out notice, the main controller 83 resets the processing of the current standby state and directs that the command be resent, by communication through a communication line SL4 between the communication interfaces 87 used to synchronize the recording system, the ink management system, and the nozzle inspection system between the controllers 41 and 42. This directive is sent to the main controllers 83 on the other sides by communication through the communication interface 87. The two main controllers 83 both first reset the current processing that is on standby, and then direct the mechanical controller 82 to resend the command.

The communication interface 87 is provided to perform communication so that the head controller 89, the ink manager 91, and the inspection controller 92 on the master and slave sides can synchronize their processing, and so that information can be exchanged back and forth. When there is a communication error on the communication line SL3, the communication interface 87 is utilized to request retransmission of the command. Also, the timer 90 performs timer processing such as managing the time, serving as a clock for standby time, serving as a clock for cleaning setting time, and so on.

The ink manager 91 shown in FIG. 5 acquires the ink consumption for eight colors as consumed by the approximately one half of the recording heads 29A (or 29B) from an ink consumption computer (not shown) inside the ASIC 54. The ink manager 91 sends ink consumption information for the four colors managed by the other side, through the mechanical controller 82 and the communication interface 87 to the ink manager 91 on the other side at a specific point in time, such as when a request is received for remaining ink amount information from the printer driver 122, when a single print job has ended, or when the power supply is shut off. The ink manager 91 further comprises a remaining ink amount computer 98, and adds up by color the received ink consumption amount for four colors and the ink consumption for the four colors handled by the device itself, and computes the ink consumption for four colors as consumed by all the recording heads 29. The remaining ink amount computer 98 also subtracts this four-color ink consumption from the remaining ink amount from the previous time, and thereby calculates the current remaining ink amount. The current remaining ink amount information is temporarily stores in a specific memory region of the RAM 55, and the ink manager 91 writes the current remaining ink amount read from the RAM 55 to the nonvolatile memory 56, and writes to the memory of the IC elements 47, at a specific time, such as when the power supply is shut off.

Also, when a request for remaining ink amount information is received from the printer driver 122, the ink manager 91 sends the current remaining ink amount stored in the RAM 55 to the ink manager 91 of the controller on the other side. The ink manager 91 sends the remaining ink amount information for all eight colors, which combines the four colors handle by the device itself and the four colors handled on the other side, to the printer driver 122 via the USB ports U3 and U4. At this point the printer driver 122 receives eight-color remaining ink amount information (the same information) from both of the master and slave controllers 41 and 42, but the display of the remaining ink amount on the monitor 123 is performed by using one of the two sets of remaining ink amount information received along different communication paths. If the two sets of remaining ink amount information are different, though, the remaining ink amount information received from the master controller 41 is employed.

The timer 90 keeps track of the elapsed time from the end of cleaning in which the maintenance apparatus 32 forcibly sucks out the ink from the nozzles of the recording heads 29, and notifies the main controller 83 every time this measured time reaches the cleaning setting time. Upon receiving this notification, the main controller 83 first directs the inspection controller 92 to carry out a nozzle inspection. The inspection controller 92 works with the head controller 89 to cause test ink droplets to be sprayed from the nozzles of the recording heads 29 while the nozzle inspection components 48 detects the change in potential at the caps 33 in the course of this spraying of the ink droplets, and each of the recording heads 29 is tested for detective nozzles based on this detection result. The inspection controller 92 sends the inspection result of the recording heads 29 managed on its own side, through the communication interface 87, and to the inspection controller 92 on the other side. The inspection controller 92 then makes an overall decision about the received inspection result of the recording heads 29 managed on the other side and the inspection result of the recording heads 29 managed on its own side, and determines whether or not the recording heads 29 need cleaning. If even one of the recording heads 29 to be cleaned has at least the specified number of defective nozzles, the inspection controller 92 designates that recording head 29 and requests that the main controller 83 execute selective cleaning. Based on this request, the main controller 83 directs the mechanical controller 43 through the mechanical controller 82 and the mechanical interface 84 to selectively clean the designated recording head 29. If more than one of the recording heads 29 is to be cleaned, the constitution may be such that all of the recording heads 29 are normally cleaned. Also, the nozzle inspection performed by the inspection controller 92 may be carried out just before the carriage 27 starts to move from its home position at the start of printing.

Next, the flow of processing by the controllers 41 and 42 in the printer 11 will be described through reference to FIGS. 6 to 12. The main processing consists of processing in which a command is outputted to the mechanical controller 43 while synchronizing the controllers 41 and 42 that have received the print data (command output processing), and processing in which the command is resent when an error notification is received from the mechanical controller 43 (command retransmission processing). There is also command retransmission processing when a communication error occurs due to abnormal communication between the controllers 41 and 42 via the communication line SL3.

Figure 6:
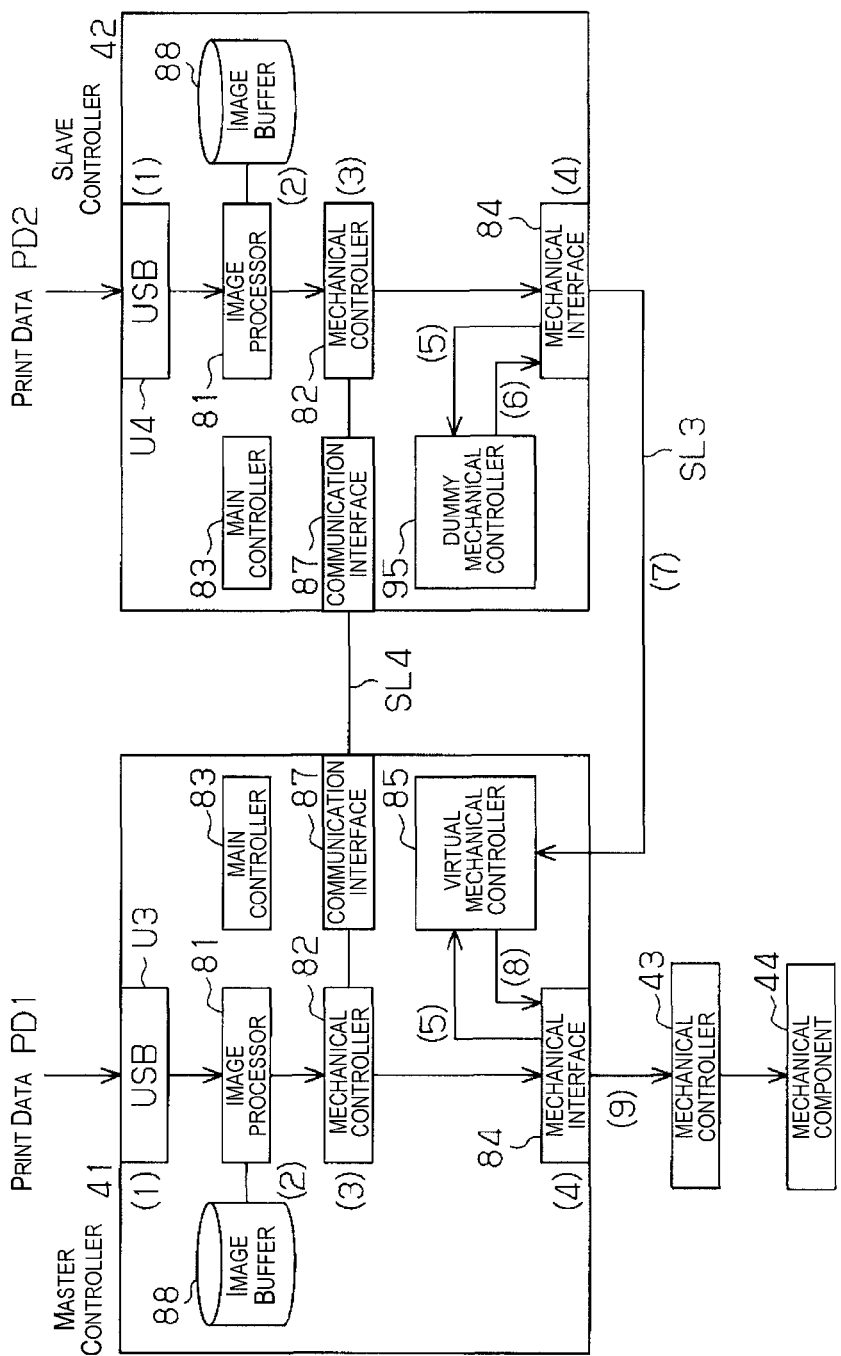
FIG. 6 is a block diagram of the flow of processing during the sending of a command.
Figure 7:
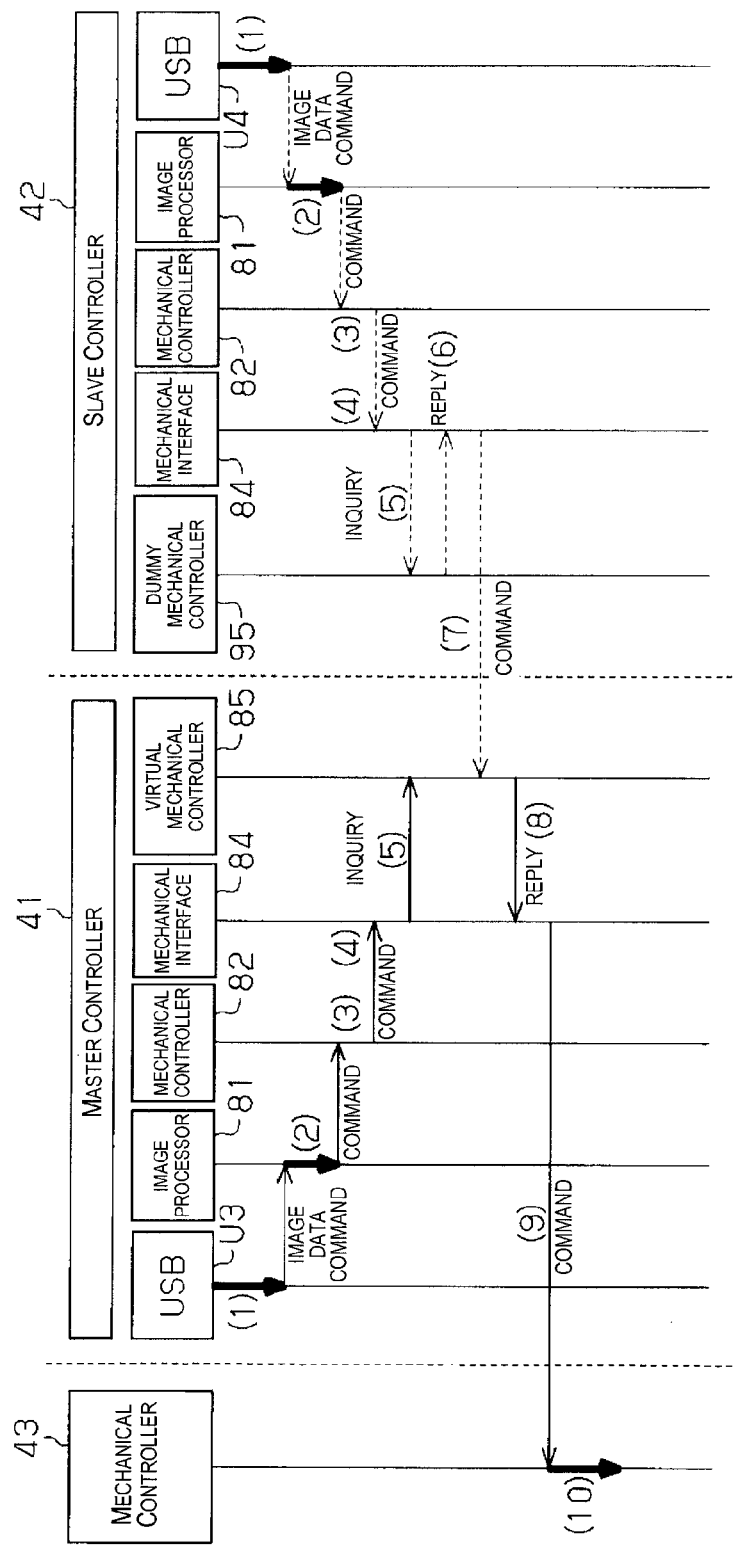
FIG. 7 is a sequence diagram during the sending of a command by the master and slave controllers.

First, command output processing will be described through reference to FIGS. 6 and 7. FIG. 6 is a block diagram of the flow of command output processing, and FIG. 7 is a sequence diagram of the flow of this same processing. As shown in FIGS. 6 and 7, the flows of processing performed inside the master controller 41 and the slave controller 42 (indicated by arrows in the drawings) are in left and right symmetry in the drawings. This means that the controllers 41 and 42 both have the same configuration in terms of processing function.

As shown in FIGS. 6 and 7, the controllers 41 and 42 are such that the print data PD1 and PD2 sent from the host device 120 is received by the USB ports U3 and U4, respectively ((1) in the drawings). The print image data included in the print data PD1 and PD2 differs according to the recording heads 29A and 29B being handled, but the commands included in them are the same.

The image processor 81 extracts the print data PD1 and PD2 inputted from the USB ports U3 and U4, and then divides up the data into print image data and commands, subjects the print image data first to microweaving and then to vertical-horizontal conversion while storing the head control data thus obtained in the image buffer 88, and sends the previously divided commands to the mechanical controller 82 ((2) in the drawings).

The mechanical controller 82 monitors the progress of the head controller 89 (see FIG. 5) while outputting a command to the mechanical interface 84 at a specific point in time ((3) in the drawings). Commands include, for example, a conveyance command, a suction command, a first carriage start-up command (carriage main scanning direction movement command), a second carriage start-up command (carriage sub scanning direction movement command), and a suction release command. These commands are sent at a suitable timing that matches the progress on the mechanical controller 43 side.

Upon receiving a command ((4) in the drawings), the mechanical interface 84 makes an inquiry to the virtual mechanical controller 85 on the master side ((5) in the drawings), and makes an inquiry to the dummy mechanical controller 95 on the slave side ((5) in the drawings).

Upon receiving an inquiry, the dummy mechanical controller 95 on the slave side immediately replies unconditionally with an Ack signal ((6) in the drawings). Upon receiving this reply, the mechanical interface 84 on the slave side outputs the command to the communication line SL3 ((7) in the drawings). The command outputted by the mechanical interface 84 on the slave side is sent through the communication line SL3 to the virtual mechanical controller 85 on the master side.

Upon receiving the commands from the mechanical interfaces 84 on the master and slave sides, the virtual mechanical controller 85 decides whether or not the two commands are the same, and if they are the same, replies with an Ack signal to the mechanical interface 84 on the master side ((8) in the drawings). Upon receiving this reply of an Ack signal, the mechanical interface 84 on the master side sends the command to the mechanical controller 43 ((9) in the drawings).

The mechanical controller 43 then controls the drive of the mechanical component 44 according to the received command. In the case of a conveyance command, for example, the mechanical controller 43 drives the conveyance motor 61 to convey the sheet 13, and in the case of a first carriage start-up command, it drives the first carriage motor 62 and moves the carriage 27 in the main scanning direction X. While the carriage 27 is moving, the recording heads 29 controlled by the controllers 41 and 42 spray out ink droplets from their nozzles, and one pass of printing is performed on the print region of the sheet 13. The drive of the second carriage motor 63 then moves the carriage 27 in the sub scanning direction Y under the command received for each pass, while the carriage 27 is moved in the main scanning direction, the result being that printing is performed the specified number of passes. Consequently, when a single print job is complete, the conveyance motor 61 is driven and the sheet 13 conveyed to the next print position under the conveyance command that is received next.

As shown in FIGS. 6 and 7, the command output processing thus proceeds in a symmetrical processing flow between the master controller 41 and the slave controller 42. Accordingly, the master controller 41 and the slave controller 42 can share their configuration, and a shared circuit configuration and a shared program configuration can be employed.

Figure 8:
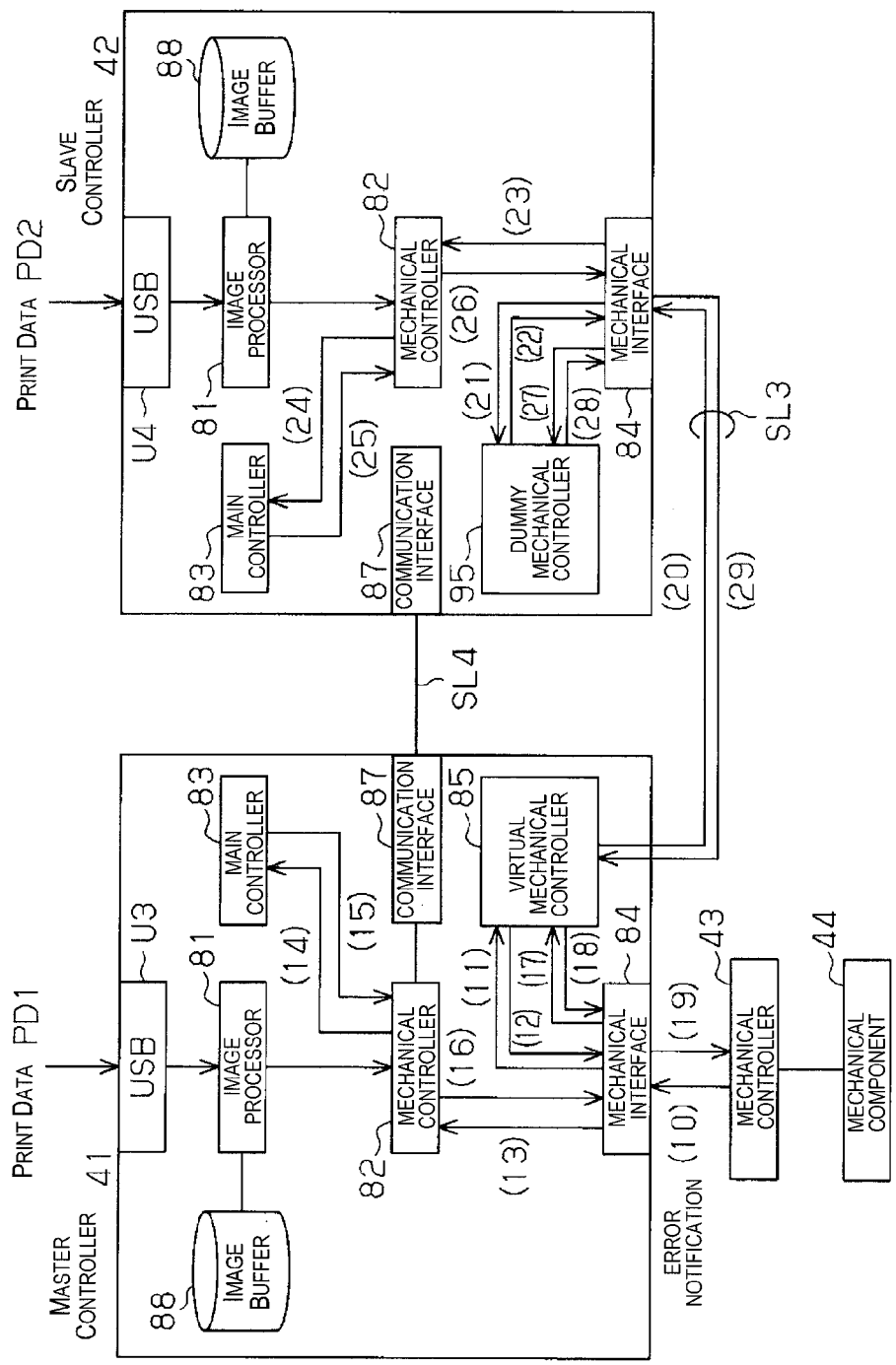
FIG. 8 is a block diagram of the flow of processing during error occurrence.
Figure 9:
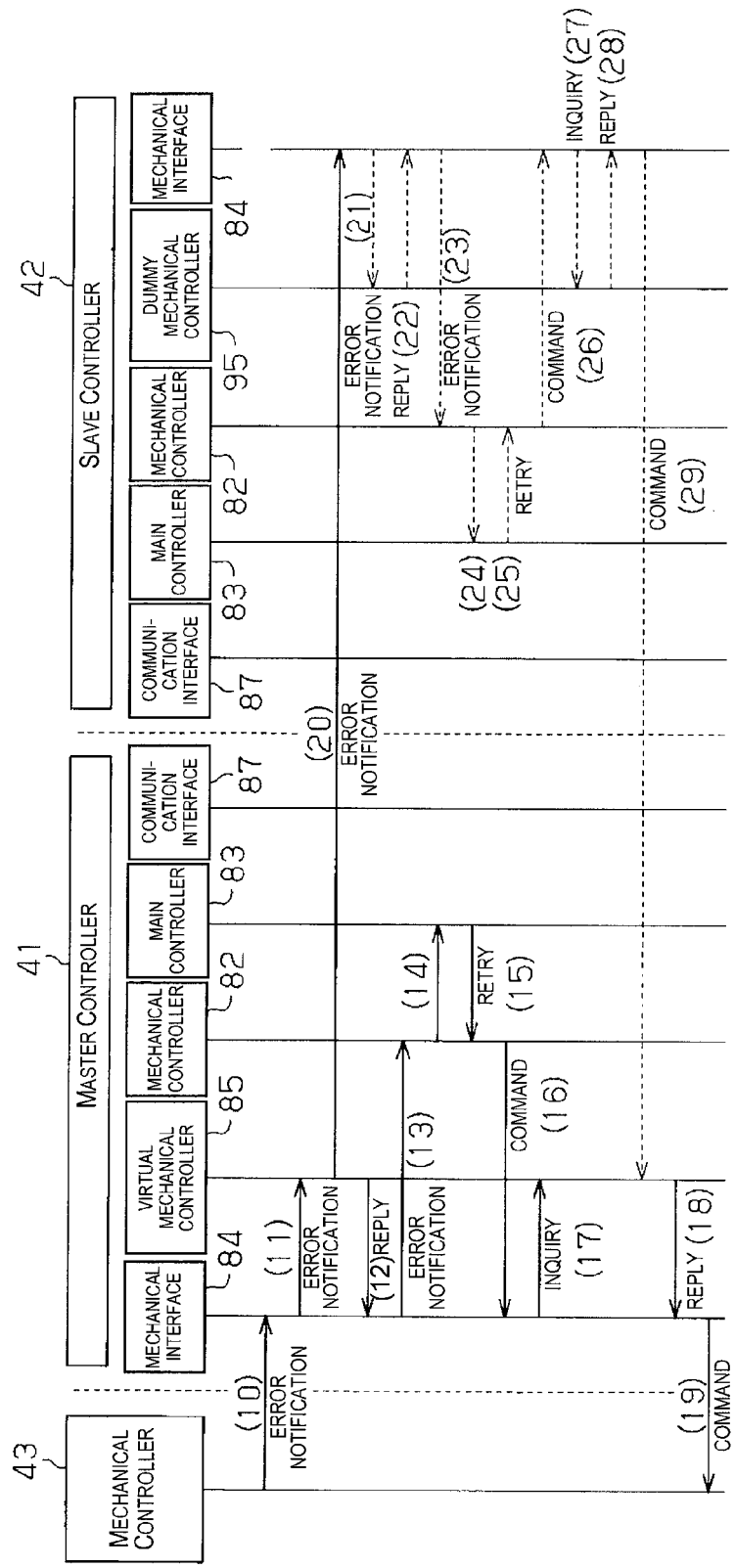
FIG. 9 is a sequence diagram during error occurrence in the master and slave controllers.

Next, command retransmission processing will be described. First, command retransmission processing when communication is normal between the controllers 41 and 42 via the communication line SL3 will be described through reference to FIGS. 8 and 9. FIG. 8 is a block diagram of the flow of command retransmission processing, and FIG. 9 is a sequence diagram of the flow of this processing. The flow of processing related to the master side is numbered in the tens in the drawings, while the flow of processing related to the slave side is numbered in the twenties.

When there is an error in receiving a command or an error in control, the mechanical controller 43 sends an error notification to the master controller 41 requesting the retransmission of the command ((10) in the drawings). Upon receiving an error notification, the mechanical interface 84 on the master side sends a message to this effect to the virtual mechanical controller 85 ((11) in the drawings).

The virtual mechanical controller 85 sends an error notification through the communication line SL3 to the mechanical interface 84 on the slave side ((20) in the drawings), and after this transmission, replies with an Ack signal to the mechanical interface 84 on the master side ((12) in the drawings). Having received the Ack signal, the mechanical interface 84 sends an error notification to the mechanical controller 82 ((13) in the drawings), and the mechanical controller 82 sends an error notification to the main controller 83 ((14) in the drawings).

Meanwhile, on the slave side, the mechanical interface 84 that has received the error notification notifies the dummy mechanical controller 95 to that effect ((21) in the drawings). The dummy mechanical controller 95 immediately replies with an Ack signal to the mechanical interface 84 ((22) in the drawings). Having received the Ack signal, the mechanical interface 84 sends an error notification to the mechanical controller 82 ((23) in the drawings), and the mechanical controller 82 sends an error notification to the main controller 83 ((24) in the drawings).

Upon receiving an error notification, the main controllers 83 on the master and slave sides direct the mechanical controller 82 to resend (retry) the command ((15) and (25) in the drawings). The mechanical controller 82 follows this directive by resending the command to the mechanical interface 84 ((16) and (26) in the drawings). On the master side, when the mechanical interface 84 receives a retransmission command, it makes an inquiry, with the retransmission command attached, to the virtual mechanical controller 85 ((17) in the drawings), while on the slave side, when the mechanical interface 84 receives a retransmission command, it makes an inquiry, with the retransmission command attached, to the dummy mechanical controller 95 ((27) in the drawings). The dummy mechanical controller 95 immediately and unconditionally replies to the inquiry with an Ack signal ((28) in the drawings), and having received this Ack signal, the mechanical interface 84 outputs the retransmission command to the communication line SL3, and this command is received by the virtual mechanical controller 85 ((29) in the drawings). The virtual mechanical controller 85 decides whether or not the commands received from the mechanical interfaces 84 on the master and slave sides are the same, and it confirms them to be the same, it replies with an Ack signal to the mechanical interface 84 ((18) in the drawings). When this reply is received, the mechanical interface 84 resends the command to the mechanical controller 43 ((19) in the drawings).

Thus, the processing (10) to (19) on the master side from receipt of the error notification by the mechanical interface 84 until the output of the retransmission command is in symmetry with the processing (20) to (29) on the slave side from the receipt of the error notification by the mechanical interface 84 until the output of the retransmission command. Consequently, the same program and processing circuit configurations can be used on both the master and slave sides.

Figure 10:
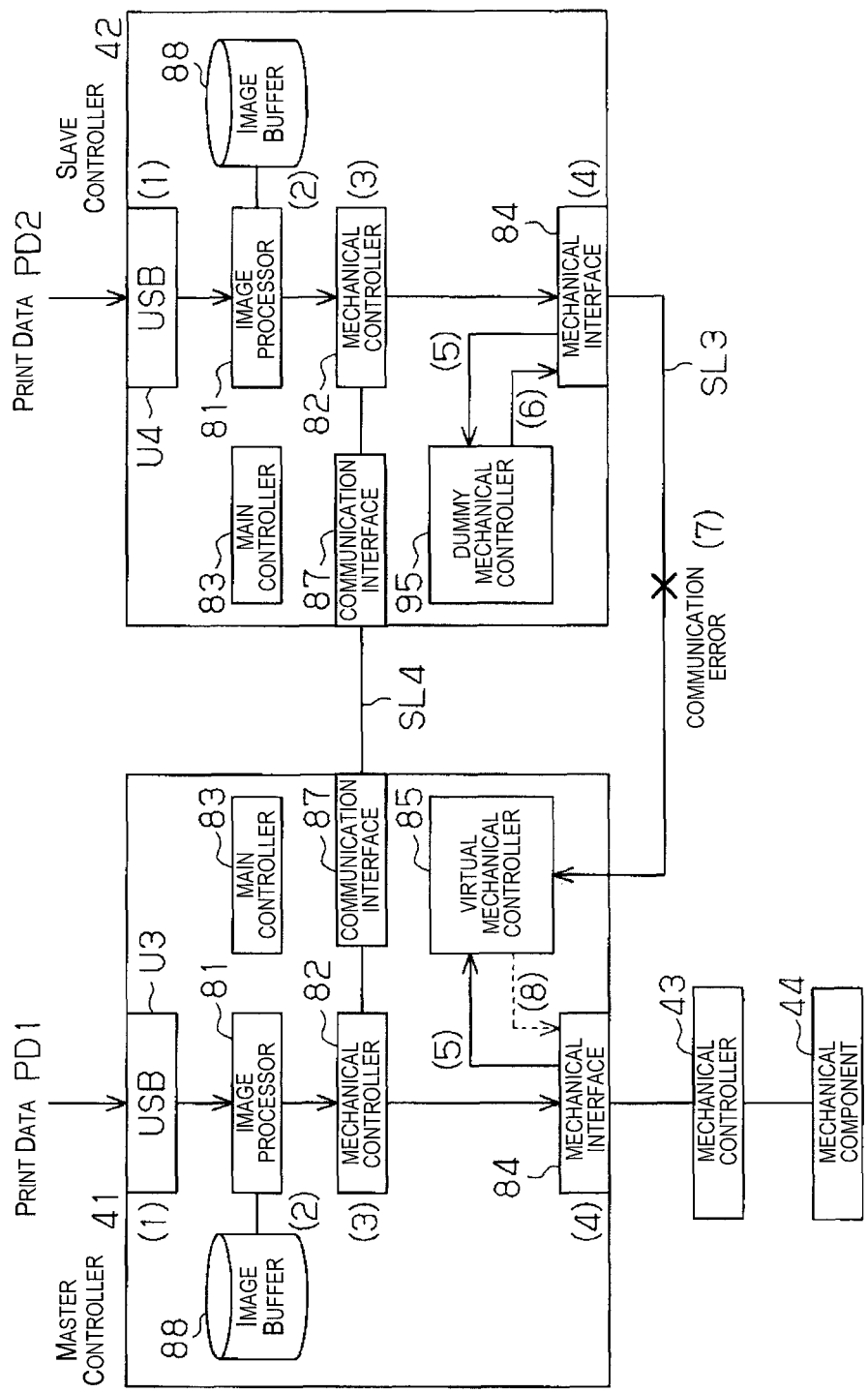
FIG. 10 is a block diagram of the flow of processing when a communication error has occurred.

Next, command retransmission processing when an error occurs in communication via the communication line SL3 between the controllers 41 and 42 in command output processing will be described through reference to FIGS. 10 to 12. FIGS. 10 and 11 are block diagrams of the flow of command retransmission processing when a communication error occurs, and FIG. 12 is a sequence diagram of the flow of this processing.

As shown in FIG. 10, in command output processing, on the master side, when the mechanical interface 84 that has received a command from the mechanical controller 82 makes a command inquiry to the virtual mechanical controller 85 ((5) in the drawings), the virtual mechanical controller 85 is in a state of waiting until a command is received from the mechanical interface 84 on the slave side.

Meanwhile, on the slave side, when the mechanical interface 84 that has received a command from the mechanical controller 82 makes a command inquiry to the dummy mechanical controller 95 ((5) in the drawings), a reply with an Ack signal is immediately received from the dummy mechanical controller 95 ((6) in the drawings), so the command is sent through the communication line SL3 to the virtual mechanical controller 85 on the master side ((7) in the drawings). At this point the virtual mechanical controller 85 checks the received data (parity check, etc.) and requests the retransmission of the command if there is an error in the content of the data, but if no command can be received after the request has been repeated a specific number of times, the virtual mechanical controller 85 times out. Once this happens, since there is no reply with an Ack signal from the virtual mechanical controller 85 ((8) in the drawings), the mechanical interface 84 on the master side similarly times out. Meanwhile, on the slave side, since the mechanical interface 84 cannot send a command to the virtual mechanical controller 85 through the communication line SL3, it too times out.

Figure 11A:
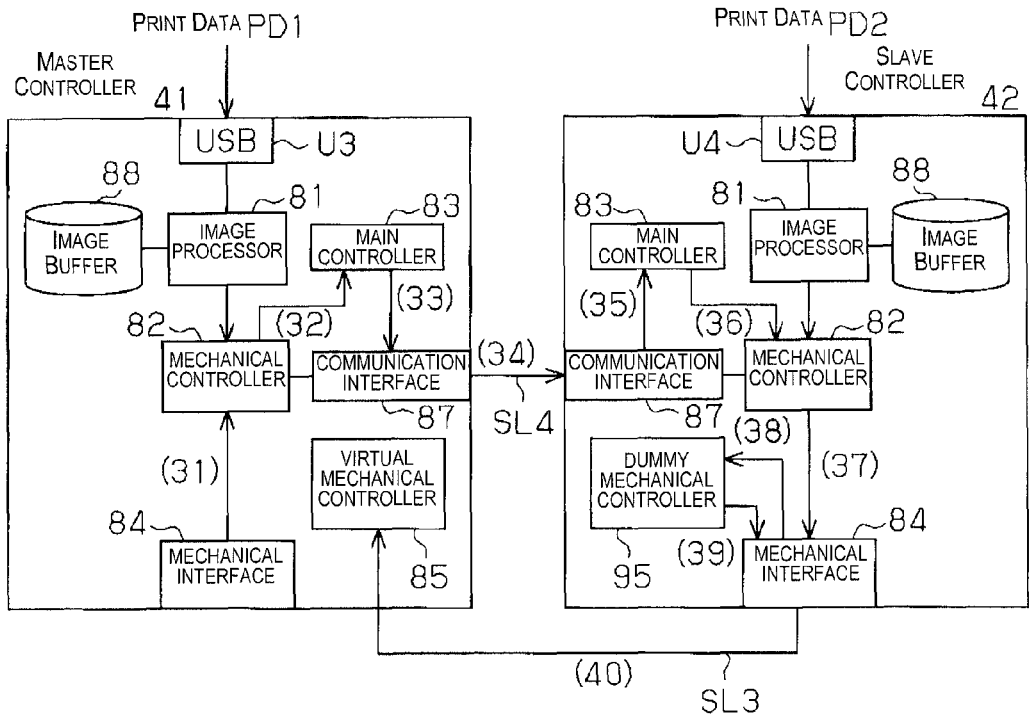
FIG. 11 is a block diagram showing the flow of processing when the master side is the starting point (a) and the flow of processing when the slave side is the starting point (b), when a communication error has occurred.
Figure 11B:
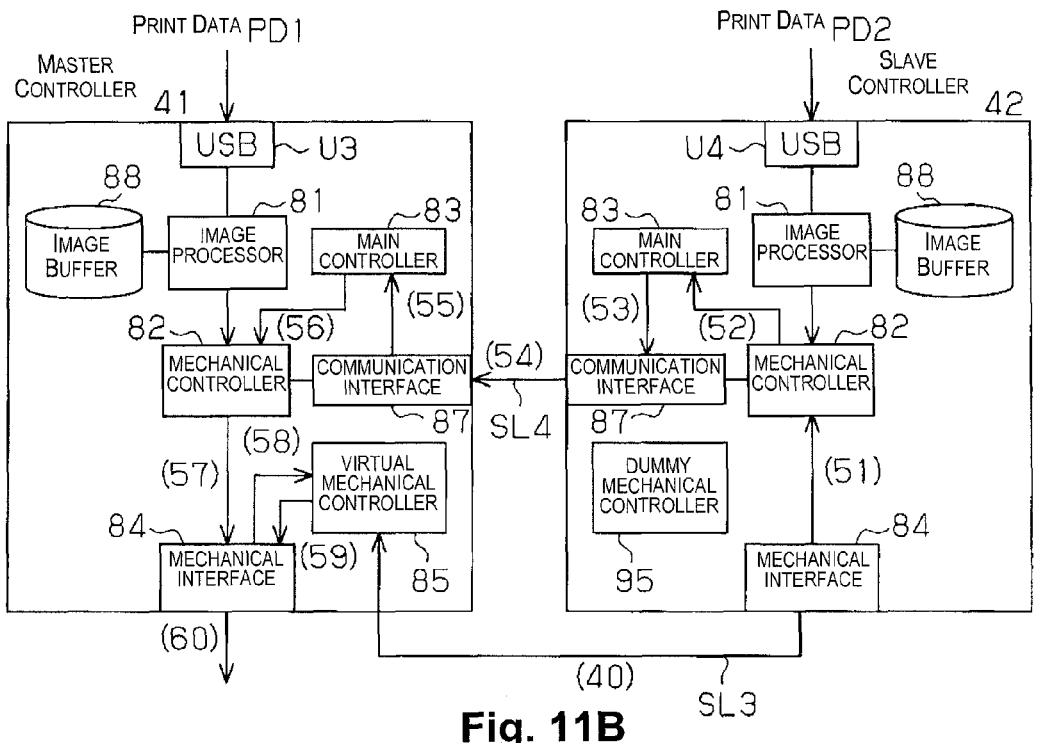
Figure 12:
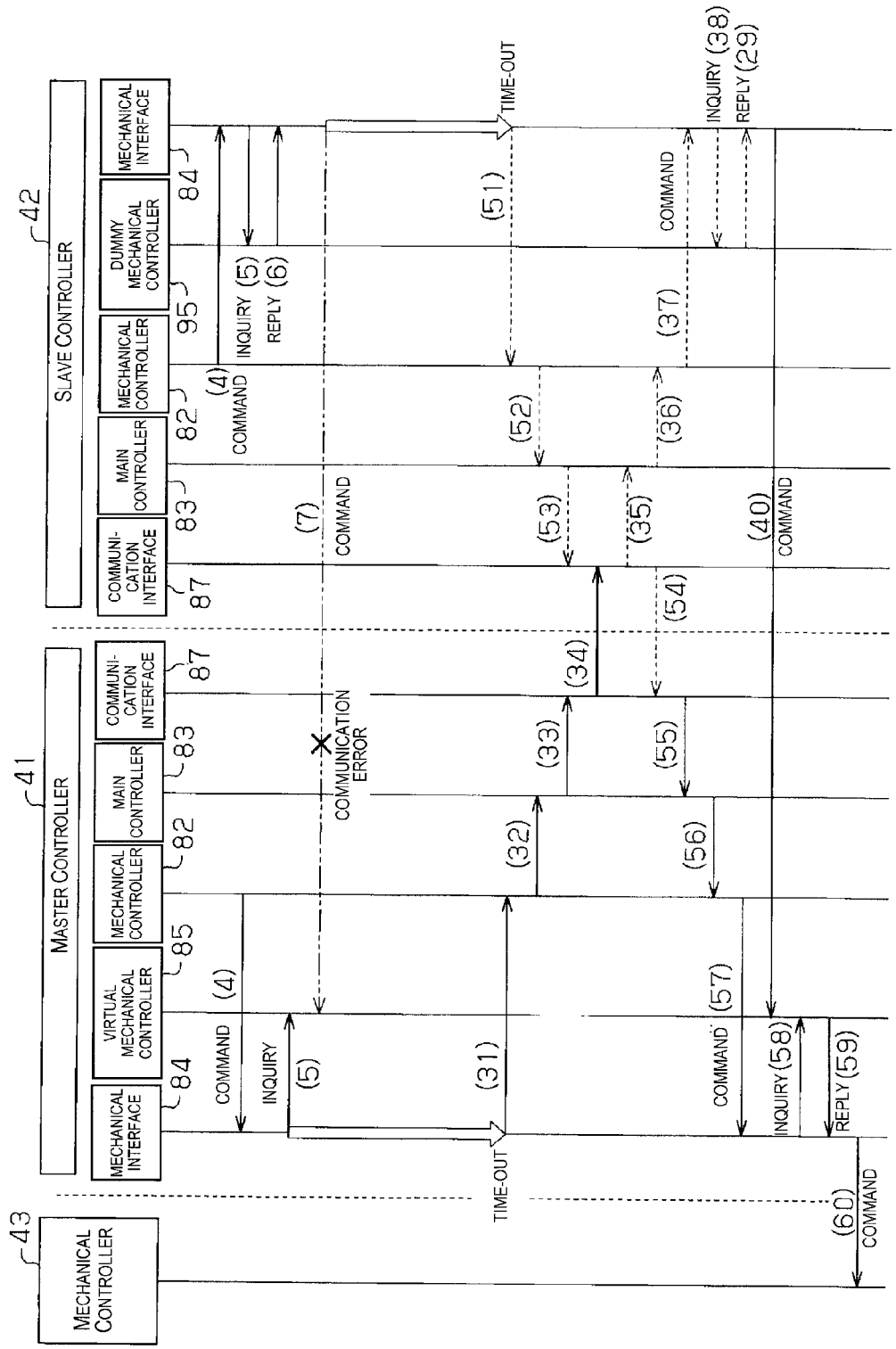
FIG. 12 is a sequence diagram when a communication error has occurred between the master and slave controllers.

If the mechanical interfaces 84 on both the master and slave sides time out, the processing shown in FIGS. 11 and 12 is performed. The processing numbered in the thirties and forties in FIGS. 11*a* and 12 indicates processing from the master side to the slave side, and processing numbered in the fifties and sixties in FIGS. 11*b* and 12 indicates processing from the slave side to the master side.

As shown in FIGS. 11 and 12, once the mechanical interfaces 84 have timed out, the mechanical controller 82 is notified of a communication error ((31) and (51) in the drawings). The mechanical controller 82 also notifies the main controller 83 of this ((32) and (52) in the drawings). The main controller 83 directs the communication interface 87 to resend the command ((33) and (53) in the drawings), and a directive to resend the command is sent to the controllers on the other side between the communication interfaces 87 through the communication line SL4 ((34) and (54) in the drawings).

The communication interface 87 on the other side sends the main controller 83 a directive to resend the command ((35) and (55) in the drawings). The main controller 83 on the other side receives this directive to resend the command, and directs the mechanical controller 82 to resend the command ((36) and (56) in the drawings).

The mechanical controller 82 first halts the processing that is currently in progress (including the control of the head controller 89), and performs the processing including command retransmission one more time ((37) and (57) in the drawings). The command resent from the mechanical controller 82 is received by the mechanical interface 84.

When the mechanical interface 84 on the master side receives the retransmission command, it makes a command inquiry to the virtual mechanical controller 85 ((58) in the drawings). Meanwhile, when the mechanical interface 84 on the slave side receives the retransmission command, it makes a command inquiry to dummy mechanical controller 95 ((38) in the drawings). The dummy mechanical controller 95 immediately and unconditionally replies with an Ack signal ((39) in the drawings), and the mechanical interface 84 that has received this reply sends the command through the communication line SL3 to the virtual mechanical controller 85 ((40) in the drawings).

When the command is received through the communication line SL3 and the command on the master side and the command on the slave side have both been inputted, the virtual mechanical controller 85 on the master side decides whether or not the two commands are the same, and if they are, it replies with an Ack signal to the mechanical interface 84 on the master side ((59) in the drawings). Upon receiving a reply with an Ack signal from the virtual mechanical controller 85, the mechanical interface 84 sends the retransmission command to the mechanical controller 43 ((60) in the drawings).

Thus, in this embodiment, even if an error occurs in communication through the communication line SL3, a directive to resend a command can still be sent to the main controller 83 on the other side through the communication line SL4 by communication between the communication interfaces 87. For example, if a communication error prevents a command from being sent to the mechanical controller 43, the controllers 41 and 42 stop processing and fall into an error state, in which case the controllers 41 and 42 have to be reset. When the controllers 41 and 42 are each reset, the processing in which the print data PD1 and PD2 is sent from the host device 120 to the controllers 41 and 42, respectively, has to be done over. This retransmission of the print data PD1 and PD2 takes some time because it involves serial communication, and results in a relatively long waiting time until the printing can be started.

With this embodiment, however, if an error should occur in communication via the communication line SL3, a directive to resend the command can be sent to the main controller 83 of the controller on the other side via the communication line SL4, so retransmission of the command is all that is needed. Accordingly, retransmission by serial communication of the print data PD1 and PD2 during resetting is unnecessary, and waiting time caused by the retransmission of the print data PD1 and PD2 in the middle of printing can be avoided as much as possible.

As detailed above, the effects listed below can be obtained in this embodiment.

(1) Since the master controller 41 and the slave controller 42 can use the same program, there is no need to design and produce separate programs for master and slave use. Therefore, the development time for the printer 11 is shorter, and development costs can be kept lower.

(2) Upon receiving a command, the mechanical interface 84 makes an inquiry to the virtual mechanical controller 85, and in response to this inquiry the virtual mechanical controller 85 replies with an Ack signal to the mechanical interface 84 on the master side if the command received from the outside through the communication line SL3 is the same as the command inquired about. Since the configuration is such that the mechanical interface 84 sends a command to the mechanical controller 43, the command can be sent at a synchronized timing that matches the printing processing for both the recording heads 29B, which are controlled on the master side, and the recording heads 29A, which are controlled on the slave side.

(3) When an error notification is received from the mechanical controller 43, the mechanical interface 84 notifies the virtual mechanical controller 85 to that effect, an error notification is sent from the virtual mechanical controller 85 to the mechanical interface 84 on the slave side, and when a reply indicating that this notification was sent is received, an error notification is sent to the mechanical controller 82. The mechanical interface 84 on the slave side then sends an error notification to the dummy mechanical controller 95, and if there is an unconditional reply from the dummy mechanical controller 95, an error notification is sent to the mechanical controller 82. Thus, error notification from the mechanical controller 43 can be sent to both of the main controllers 83 on the master and slave sides. The two main controllers 83 then direct the mechanical controller 82 to retry transmission, so the mechanical controller 82 makes a retry and can resend the command.

(4) When a power supply on signal is inputted when the power switch 71 of the printer 11 has been turned on, the main controller 83 determines whether the controller assigned to itself is the master or the slave from the combination (Vin, Vout) of voltage levels of the input terminal 58A and the output terminal 58B of the terminal 51 (or 52). Accordingly, the device can easily determine whether it is itself the master or the slave from the connection state of the controllers 41 and 42. For example, master information of slave information is stored ahead of time in the nonvolatile memory 56, and it is possible to decide whether the device is itself the master or the slave based on the stored information in the nonvolatile memory 56 when the power is on. However, if the board on which the nonvolatile memory 56 is mounted is replaced, such as when the slave-side board and the master-side board are swapped, the master and slave controllers 41 and 42 are switched regardless of the connection state of the controllers 41 and 42, and the printer 11 will no longer function properly.

In contrast, in this embodiment, since it is decided which is master and which is slave based on the connection state of the controllers 41 and 42, master and slave can be properly set according to the connection state of the controllers 41 and 42. For instance, even if the connection state between the controllers 41 and 42 is reversed, or if the board of the nonvolatile memory 56 is replaced, master and slave can still be properly set.

(5) When the main controller 83 identification is of master, the virtual mechanical control section 96 (out of the virtual mechanical controller; master actualization component) is actuated to construct the virtual mechanical controller 85. On the other hand, if the main controller 83 identification is of slave, the dummy mechanical control section 97 (out of the virtual mechanical controller; slave actualization component) is actuated to construct the dummy mechanical controller 95. Thus, the controllers 41 and 42 can be set to either the master controller 41 having the master function or the slave controller 42 having the slave function by actuating either the virtual mechanical control section 96 or the dummy mechanical control section 97 out of the virtual mechanical controller with a shared configuration. Accordingly, the controllers 41 and 42 can share their configuration.

(6) A controller can be constructed as the slave controller 42 having the dummy mechanical controller 95 that replies unconditionally with an Ack signal (gives an affirmative reply) to an inquiry from the mechanical interface 84, by actuating the dummy mechanical control section 97 (slave actualization component) according to the identification result as slave by the main controller 83. Since the dummy mechanical controller 95 unconditionally gives an affirmative reply to an inquiry, a command can be sent immediately from the slave side to the master side. On the slave side, the standby time from when the mechanical interface 84 receives a command from the mechanical controller 82 until that command is outputted can be reduced as much as possible.

(7) By actuating the virtual mechanical control section 96 (master actualization component) according to the identification result as master by the main controller 83, a controller can be constructed as the master controller 41 having the virtual mechanical controller 85 that replies unconditionally with an Ack signal (gives an affirmative reply) when a command is inputted from the slave side in response to an inquiry from the mechanical interface 84.

(8) The virtual mechanical controller 85 decides whether or not a command is the same as the command received from the slave side in response to a command inquiry, and if the decision is that they are the same, it replies with an Ack signal (gives an affirmative reply) to the mechanical interface 84 on the master side. Thus, a command can be sent to the mechanical controller 43 only if the commands are the same on the master and slave sides. For example, when the commands are different on the slave and master sides, the virtual mechanical controller 85 gives a negative reply, and does not reply with an Ack signal. Accordingly, a command can be prevented from being sent to the mechanical controller 43 when the commands are different on the master and slave sides.

(9) The external output terminal of the mechanical interface 84 of the slave controller 42 was connected via the communication line SL3 to the external input terminal of the virtual mechanical controller 85 of the master controller 41. Accordingly, a command is sent from the slave controller 42 to the master controller 41, and the command can be sent to the mechanical controller 43 while synchronizing between the master controller 41 and the slave controller 42.

(10) The USB port U3 of the master controller 41 and the USB port U4 of the slave controller 42 are each allocated some of the plurality of recording heads 29 (liquid spray heads) and corresponding amounts of image data are inputted to each, so unnecessary image processing can be avoided.

(11) An ink manager 91 (control management unit) that acquires ink consumption information as data related to the plurality of recording heads 29 is provided, and ink consumption information managed by the other side is sent back and forth via the communication interface 87 (second communication unit). The ink manager 91 performs calculation processing of the remaining ink amount (specific processing) based on ink consumption information received from the other side, and ink consumption information managed by its own controller. Thus, the remaining ink amounts in the plurality of (such as eight) ink cartridges IC1 to IC8 can be allocated to and managed by the controllers 41 and 42.

(12) Nozzle inspection results are sent to the other side via the communication interface 87, and the inspection controllers 92 of the controllers 41 and 42 decide whether or not cleaning should be performed by the maintenance apparatus 32 based on the nozzle inspection results for all of the recording heads 29. If it is decided that cleaning is to be performed, the inspection controller 92 directs the mechanical controller 82 to perform the cleaning, and having received this directive the mechanical controller 82 sends a cleaning command to the mechanical interface 84. Thus, the same command (a cleaning command) can be sent by both of the controllers 41 and 42 on the master and slave sides. Therefore, when cleaning is to be performed, the cleaning command can be outputted to the mechanical controller 43, and when cleaning is not needed, no cleaning command is outputted.

The above embodiment can also be modified as in the following aspects.

A configuration may be employed in which the controllers 41 and 42 identify whether they themselves are the master controller or the slave controller based on master/slave identification information pre-stored in the nonvolatile memory 56.

The virtual mechanical controller 85 can omit deciding whether or not the two commands are the same. For example, there is no problem at all with a configuration in which the virtual mechanical controller 85 has only the function of synchronization, and replies to and notifies the mechanical interface 84 of a command received on the slave side, and the mechanical interface 84 decides whether or not the commands are the same, or with an apparatus in which there is only one kind of command, and so on.

The control management unit is not limited to being both the ink manager 91 and the inspection controller 92, and may be just one or the other.

The printing control devices are not limited to two, and a configuration can also be employed in which three or more printing control devices are connected.

There may be just one recording head. For example, with a line recording type of slender recording head, a configuration can be employed in which there are a plurality of head regions that are divided up into a plurality of nozzles and are controlled by two or more printing control devices, these printing control devices are synchronized, and commands are outputted to a mechanical controller.

The printing device is not limited to the lateral printer 11, and may instead be a serial printer, a line printer, or a page printer. Furthermore it is not limited to being an inkjet device, and the present invention can also be applied to a dot impact type of printing device.

In the above embodiments, the inkjet printer 11 was employed as a printing device, but a liquid spray device that sprays or discharges some liquid other than ink may also be employed. The present invention can also be applied to various kinds of liquid spray device equipped with liquid spray heads that discharge tiny amounts of droplets, etc. In this case, the term "droplets" refers to the state of the liquid discharged from the liquid spray device, and encompasses a granular shape, a teardrop shape, and a feathered thread shape. The "liquid" referred to here may be any material that can be sprayed from a liquid spray device. For example, it may be one in which the substance is in the liquid phase, and encompasses not only liquids such as high or low viscosity liquids, sols, gels, water or other inorganic solvents, organic solvents, solutions, liquid resins, and liquid metals (molten metals), or materials in which a liquid is one of the states of the substance, but also the product of dissolving, dispersing, or mixing grains of a functional material composed of a pigment, metal particles, or other such solid in a solvent. Typical examples of liquids include ink, as described in the above embodiments, and liquid crystals. Here, the term "ink" encompasses various kinds of liquid composition, such as hot melt inks, gel inks, oil-based inks, and water-based inks. Specific examples of liquid spray devices include those that spray out a liquid containing, in the form of a dispersion or solution, a material such as an electrode material or colorant, and used in the manufacture of liquid crystal displays, EL (electroluminescent) displays, flat screen displays, and color filters, for example. Other examples include a liquid spray device that sprays out a biological organic substance used in bio-chip manufacture, a liquid spray device that sprays out a liquid that serves as a sample and is used as a compacted pellet, a textile printing device, a microdispenser, etc. Furthermore, a liquid spray device that sprays out a pinpoint stream of lubricating oil onto clocks, cameras, or other such precision machinery, a liquid spray device that sprays a UV-setting resin or other such transparent resin liquid onto a substrate in order to form a microscopic hemispherical lens (optical lens) used in optical communication elements or the like, or a liquid spray device that sprays out an acidic, alkaline, or other etching solution to etch a substrate or the like may be employed. The present invention can be applied to any of these types of liquid spray device. Also, the liquid may be particles, such as a toner. The term "liquid" as used in this Specification does not include anything composed solely of a gas.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing control device comprising:
    an input unit configured to input image data and a first command;
    a processing unit configured to process the image data and the first command inputted by the input unit;
    a drive control unit that controls drive of a mechanical component;
    a control unit configured to send a first processed command processed by the processing unit to the drive control unit;
    a first communication unit connected to the drive control unit and configured to output the first processed command to the drive control unit, in response to input of the first processed command from the control unit;
    a virtual drive control unit connected to the first communication unit; and
    a second communication unit connected to the virtual drive control unit, the second communication unit being different from the first communication unit.

2. The printing control device according to claim 1, wherein
    the first communication unit is further configured to send an error notification, which requests re-sending of the first processed command, to both the first communication unit and the virtual drive control unit when the error notification is inputted from the virtual drive control unit.

3. The printing control device according to claim 1, further comprising
    first and second printing control devices each of which is equipped with the virtual drive control unit,
    the first printing control device having the first communication unit, and
    the second printing control device having the second communication unit.

4. A printing device comprising:
    a conveyance unit configured to convey a printing medium;
    a printing head configured to spray a liquid to a printing medium conveyed by the conveyance unit;
    an input unit configured to input image data and a first command;
    a processing unit configured to process the image data and the first command inputted by the input unit;
    a drive control unit that controls drive of a mechanical component;
    a control unit configured to send a first processed command processed by the processing unit to the drive control unit;
    a first communication unit connected to the drive control unit and configured to output the first processed command to the drive control unit, in response to input of the first processed command from the control unit;
    a virtual drive control unit connected to the first communication unit; and
    a second communication unit connected to the virtual drive control unit, the second communication unit being different from the first communication unit.

5. The printing device according to claim 4, further comprising
    a print control device which is equipped with the virtual drive control unit;
    a conveyance drive control unit configured to control the drive of the conveyance unit based on a command from the printing control device; and a liquid spray head that performs printing by spraying a liquid to the printing medium conveyed by the conveyance unit.

* * * * *